US012008929B2

(12) United States Patent
Ertl et al.

(10) Patent No.: US 12,008,929 B2
(45) **Date of Patent: *Jun. 11, 2024**

(54) PRODUCT DISPLAY

(71) Applicant: WESTROCK CONTAINER, LLC, Atlanta, GA (US)

(72) Inventors: Joe Ertl, Richfield, MN (US); Jeffrey P. Pratsch, Crystal, MN (US)

(73) Assignee: WESTROCK CONTAINER, LLC, Atlanta, GA (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/983,715

(22) Filed: Nov. 9, 2022

(65) Prior Publication Data

US 2023/0154358 A1 May 18, 2023

Related U.S. Application Data

(63) Continuation of application No. 15/942,603, filed on Apr. 2, 2018, now Pat. No. 11,514,822.

(60) Provisional application No. 62/483,557, filed on Apr. 10, 2017.

(51) Int. Cl.

| | |
|---|---|
| ***G09F 7/18*** | (2006.01) |
| ***A47F 5/00*** | (2006.01) |
| ***A47F 5/11*** | (2006.01) |
| ***G09F 23/00*** | (2006.01) |

(52) U.S. Cl.
CPC .............. *G09F 7/18* (2013.01); *A47F 5/0025* (2013.01); *A47F 5/114* (2013.01); *A47F 5/116* (2013.01); *G09F 23/00* (2013.01)

(58) Field of Classification Search
CPC ........... G09F 7/18; A47F 5/0025; A47F 5/114
USPC .......................................................... 206/736
See application file for complete search history.

(56) References Cited

U.S. PATENT DOCUMENTS

| | | | |
|---|---|---|---|
| 3,090,492 | A | 5/1963 | Goldstein |
| 5,386,371 | A | 1/1995 | Mather et al. |
| 5,443,168 | A | 8/1995 | Dyment et al. |
| 5,979,338 | A | 11/1999 | Salmanson et al. |
| 5,992,683 | A | 11/1999 | Sigl |
| 6,126,131 | A | 10/2000 | Tietz |
| 6,244,194 | B1 | 6/2001 | Salmanson et al. |
| 6,386,371 | B1 | 5/2002 | Parsons |
| 6,581,330 | B1 | 6/2003 | Helsloot et al. |
| 6,607,199 | B2 | 8/2003 | Gruber |
| 6,609,466 | B2 | 8/2003 | Salmanson et al. |
| 6,722,292 | B2 | 4/2004 | Salmanson et al. |
| 6,857,642 | B2 | 2/2005 | Gruber |
| 6,892,876 | B1 | 5/2005 | Aubry et al. |
| 6,925,943 | B2 | 8/2005 | Salmanson et al. |
| 7,104,553 | B2 | 9/2006 | Gruber |
| 7,159,521 | B2 | 1/2007 | Salmanson et al. |
| 7,407,086 | B2 | 8/2008 | Borio |
| 7,681,783 | B2 | 3/2010 | Stephenson |
| 7,766,348 | B2 | 8/2010 | McFarland et al. |

(Continued)

*Primary Examiner* — Anthony D Stashick
*Assistant Examiner* — Lauren Kmet
(74) *Attorney, Agent, or Firm* — Neil G. Cohen; Rohini K. Garg

(57) ABSTRACT

A product display in accordance with the present disclosure includes a display header and a product-support structure. The display header is coupled to the product-support structure for showing product indicia related to products stored in the product-support structure to a customer at a retail location.

20 Claims, 33 Drawing Sheets

(56) References Cited

U.S. PATENT DOCUMENTS

| | | | |
|---|---|---|---|
| 7,845,894 | B2 | 12/2010 | Dickinson et al. |
| 8,485,370 | B2 | 7/2013 | Dewhurst |
| 8,561,816 | B2 | 10/2013 | Martin et al. |
| 8,584,860 | B2 | 11/2013 | Orischak et al. |
| 8,720,089 | B1 | 5/2014 | Lewis |
| 8,733,563 | B2 | 5/2014 | Fadrowski |
| 8,833,573 | B2 | 9/2014 | Tomaszewski et al. |
| 8,857,633 | B2 | 10/2014 | Dewhurst |
| 8,863,417 | B2 | 10/2014 | Gerstner |
| 8,978,280 | B2 | 3/2015 | Holt et al. |
| 8,991,624 | B2 | 3/2015 | Brozak et al. |
| 9,186,453 | B1 | 11/2015 | Russell |
| 9,415,893 | B2 | 8/2016 | Wintermute et al. |
| 11,514,822 | B2 * | 11/2022 | Ertl ......................... G09F 23/00 |
| 2006/0260979 | A1 | 11/2006 | Lutes et al. |
| 2016/0176570 | A1 | 6/2016 | Collier et al. |
| 2017/0267399 | A1 | 9/2017 | Buscema |
| 2017/0297772 | A1 | 10/2017 | Davis et al. |

* cited by examiner

PRODUCT DISPLAY

CROSS REFERENCE TO RELATED APPLICATIONS

This application is a continuation of U.S. patent application Ser. No. 15/942,603, filed Apr. 2, 2018, which claims priority to U.S. Provisional Patent Application No. 62/483,557, filed Apr. 10, 2017, the entire content of which is incorporated by reference herein.

BACKGROUND

The present disclosure relates to a product display, and particularly to a product display having a display header and a product-support structure. More particularly, the present disclosure relates to a product display having a display header attached to a product-support structure for showing product indicia related to products stored in the product-support structure to a customer at a retail location.

SUMMARY

A product display in accordance with the present disclosure includes a display header and a product-support structure. The display header is coupled to the product-support structure for showing product indicia related to products stored in the product-support structure to a customer at a retail location.

In illustrative embodiments, the display header is positioned between opposing sides of the product-support structure. The display header includes a header board and a header mount. The header mount engages with the product-support structure and the header board to support the header board relative to the product-support structure.

In illustrative embodiments, the header board includes a front side and a back side opposite the front side. The product indicia is positioned on the front side and back side of the header board. The header board is movable from a shipping position to a display position relative to the product-support structure. The product indicia is obscured by the product-support structure when the header board is in the shipping position and visible when the header board is in the display position.

In illustrative embodiments, the header mount includes a pair of elastic members. The elastic members are configured to move the header board from the shipping position to the display position at the selection of a user. The elastic members are coupled to the product-support structure and a lower end of the header board to support the header board relative to the product-support structure for movement between the shipping and display positions.

In illustrative embodiments, the product-support structure is formed to define a pocket configured to receive the header board. The pocket locates the header board relative to exterior sides of the product-support structure. The header board rides in the pocket between the shipping and display positions.

Additional features of the present disclosure will become apparent to those skilled in the art upon consideration of illustrative embodiments exemplifying the best mode of carrying out the disclosure as presently perceived.

BRIEF DESCRIPTION OF THE DRAWINGS

The detailed description particularly refers to the accompanying figures in which.

DETAILED DESCRIPTION

Figure 1:
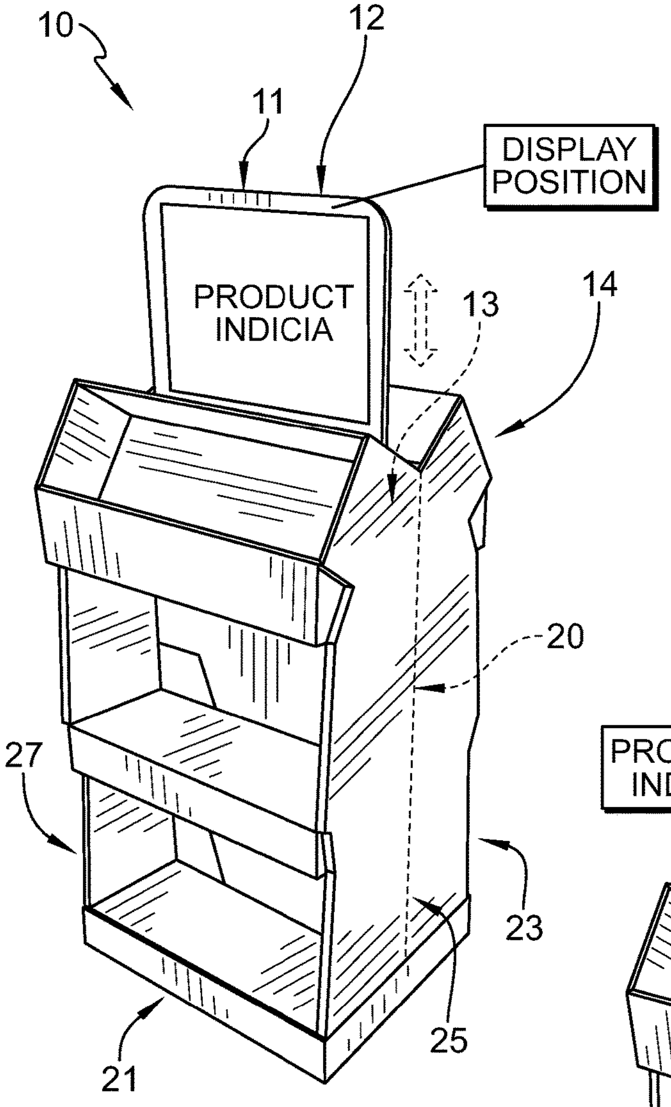
FIG. 1 is a front perspective view of a product display in accordance with the present disclosure showing that the product display includes a display header coupled to a product-support structure for showing product indicia related to products stored in the product-support structure to a customer at a retail location when the display header is in a display position.

A product display 10 in accordance with the present disclosure is shown in FIG. 1. Product display 10 includes a display header 12 coupled to a product-support structure 14. Product-support structure 14 is configured to support product for display in a retail setting. Product indicia 16 related to products stored in product-support structure 14 is positioned on a front side and back side of display header 12 and visible when display header 12 is in a display position as shown in FIG. 1.

Figure 2:
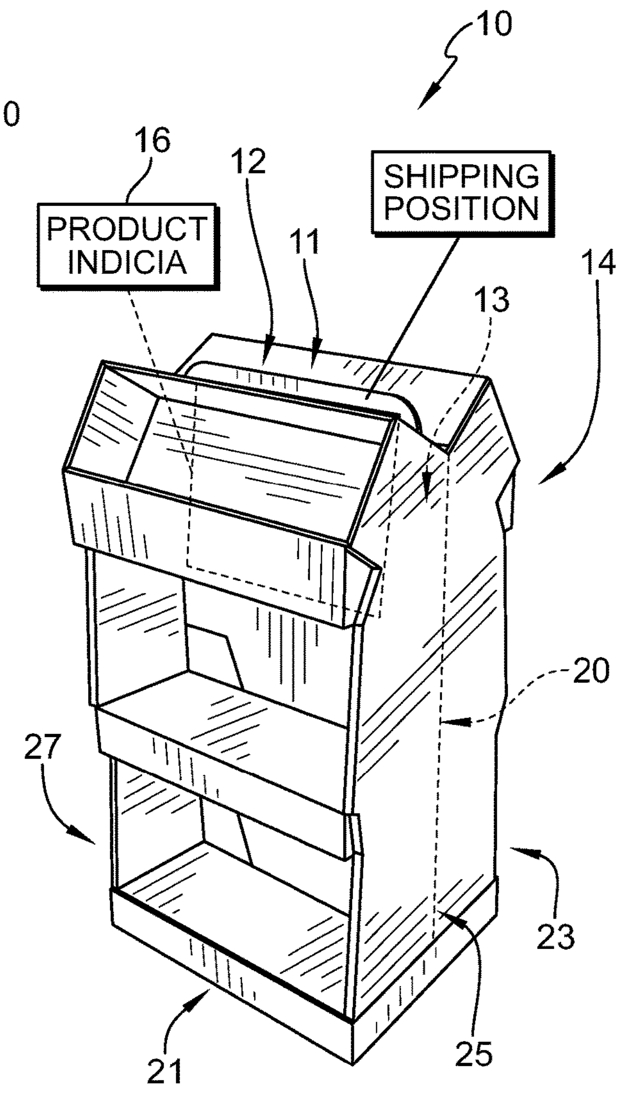
FIG. 2 is a view similar to FIG. 1 showing the display header in a shipping position and suggesting that a header board of the display header slides in a pocket of the product-support structure to obscure at least a portion of the product indicia when the header board is moved to the shipping position.

Display header 12 includes a header board 11 and a header mount 13 coupled to product-support structure 14 to support header board 11 for movement relative to product-support structure 14 between the display position, as shown in FIG. 1, and a shipping position, as shown in FIG. 2, at the selection of a user. At least a portion of product indicia 16 is obscured from view when header board 11 is in the shipping position and a height of product display 10 is reduced compared to when header board 11 is in the display position. In the illustrative embodiment, header mount 13 biases header board 11 toward the display position to support the header board 11 in the display position for showing product indicia 16 to customers at a retail location as suggested in FIG. 1.

Header board 11 is received in a pocket 20 of product-support structure 14 as suggested in FIGS. 1 and 2. Pocket 20 extends into product-support structure 14 and is positioned to lie within exterior sides 21, 23, 25, 27 of product-support structure 14. Pocket 20 locates header board 11 relative to product-support structure 14 and is configured to guide header board 11 between the display and shipping positions. Pocket 20 and header board 11 are aligned with a front side 21 and a back side 23 of product-support structure 14 where product is stored as suggested in FIG. 2, but other orientations for pocket 20 and header board 11 are contemplated by the present disclosure.

Figure 3:
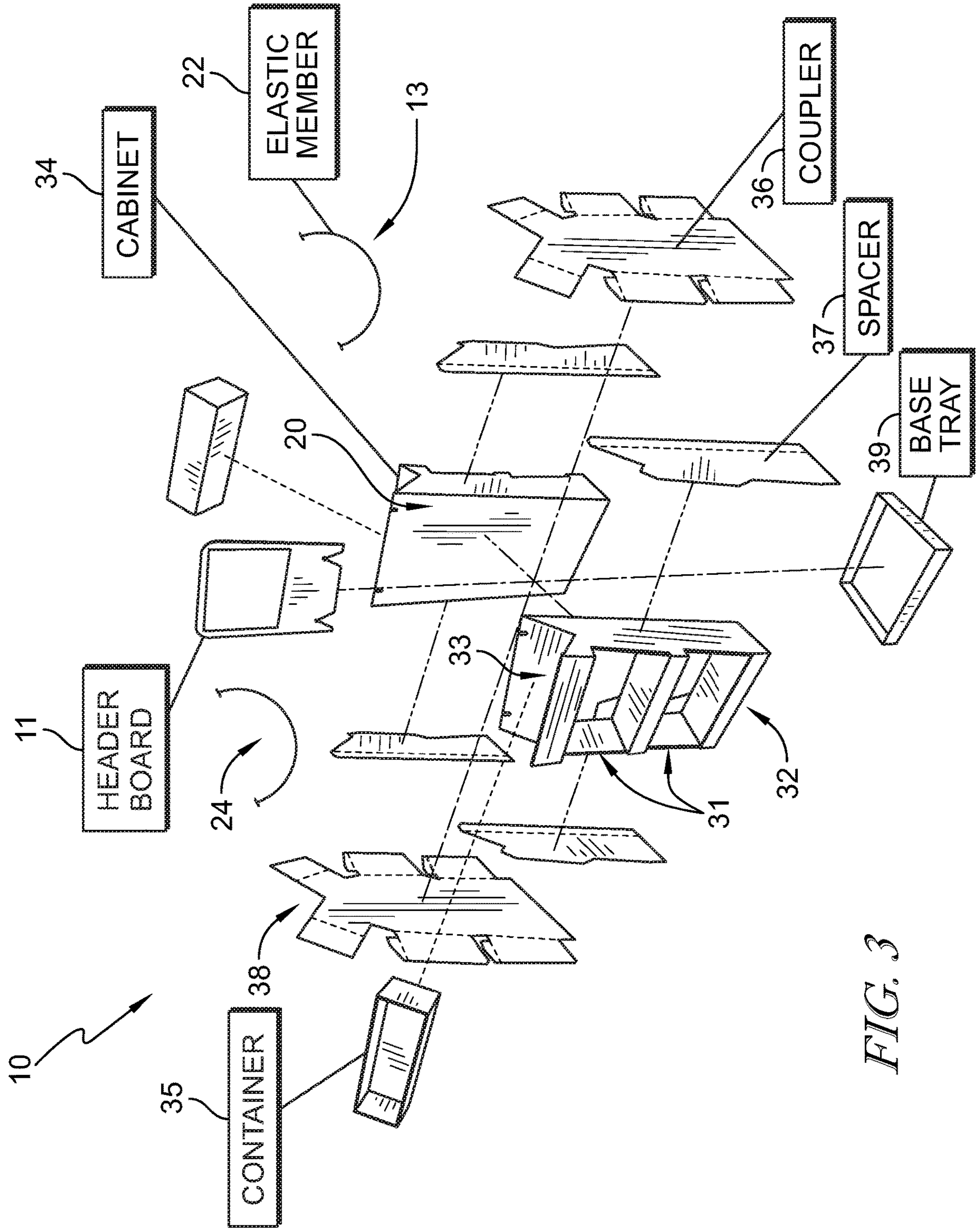
FIG. 3 is an exploded assembly view of the product display of FIG. 1 showing that the product-support structure includes opposingly faced cabinets received in a base tray and held together by couplers to trap the header board between the cabinets and suggesting that elastic members engage with the header board and cabinets to support the header board on the product-support structure.

In the illustrative embodiment, product-support structure 14 includes a pair of opposingly faced cabinets 32, 34 and a pair of couplers 36, 38 as shown in FIG. 3. Each cabinet 32, 34 is formed to define product-storage areas 31 and a receptacle 33 configured to receive a container 35. Cabinets 32, 34 and couplers 36, 38 come together to define pocket 20 for receiving header board 11. Header mount 13 includes a pair of elastic members 22, 24 that engage with cabinets 32, 34 and header board 11 to support header board 11 on product-support structure 14. In some embodiments, elastic members 22, 24 are formed as elongated strands of stretchable material, and the number of elastic members 22, 24 can be increased or decreased to adjust for size, weight, display position height, etc. of display header 12. Optional spacers 37 are positioned to lie along left and right sides of cabinets 32, 34 and configured to engage with cabinets 32, 34 to space cabinets 32, 34 apart from one another to further define pocket 20. A base tray 39 assists in holding the components of product-support structure 14 together and for supporting product-support structure 14 during transport.

Figure 4:
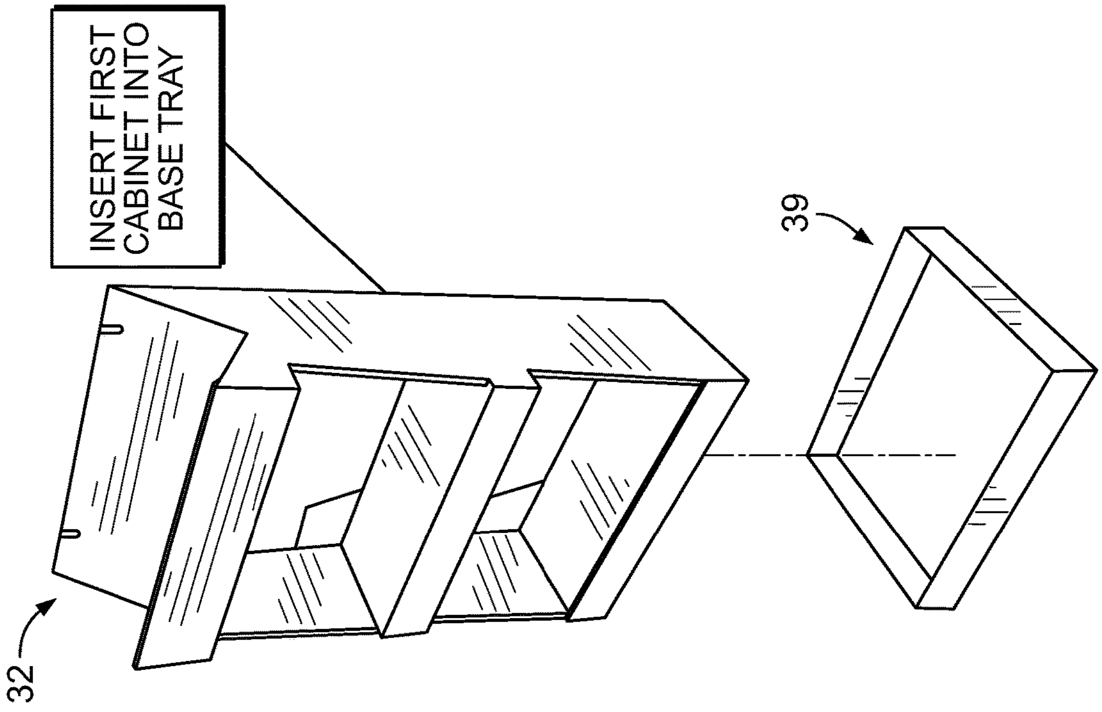
FIGS. 4-16 are a series of views showing a process in accordance with the present disclosure for assembling the product display.
Figure 5:
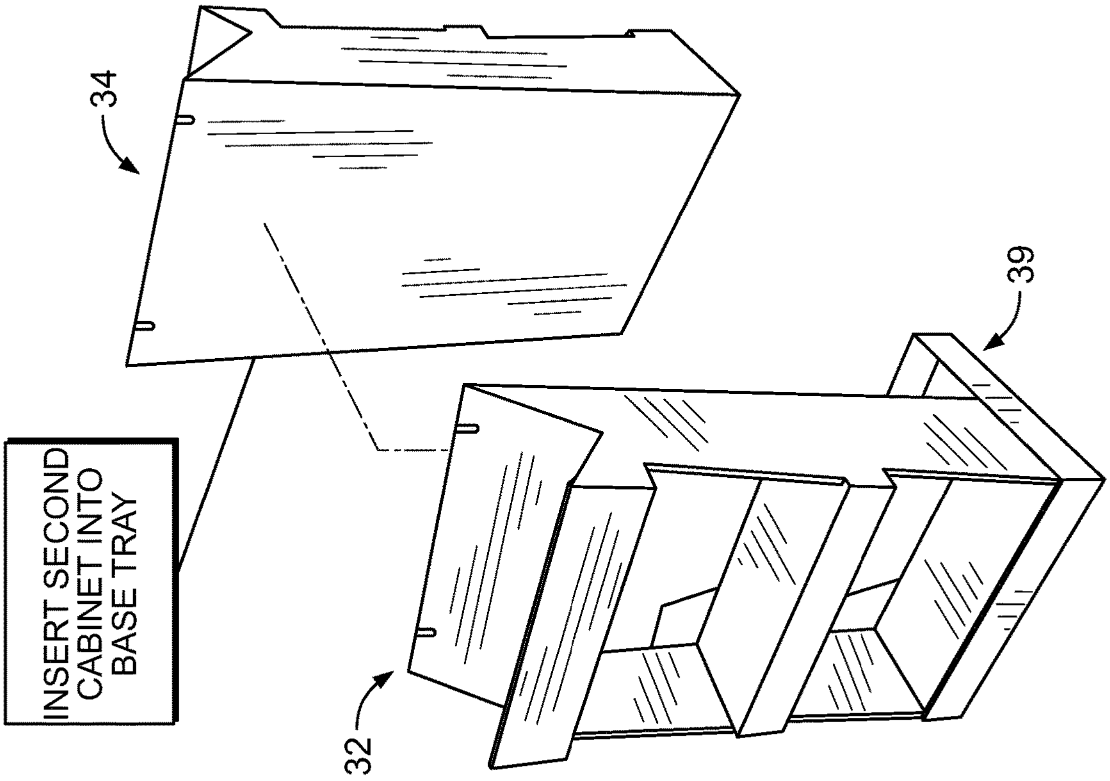

One illustrative process for assembling product display 10 is shown in FIGS. 4-16. A first cabinet 32 is inserted in to base tray 39 as suggested in FIG. 4. A second cabinet 34 is inserted into base tray 39 in an opposite orientation to first cabinet 32 as suggested in FIG. 5. Each cabinet 32, 34 is pre-assembled from a body blank 60 and an insert blank 70 shown in FIGS. 19 and 20.

Figure 6:
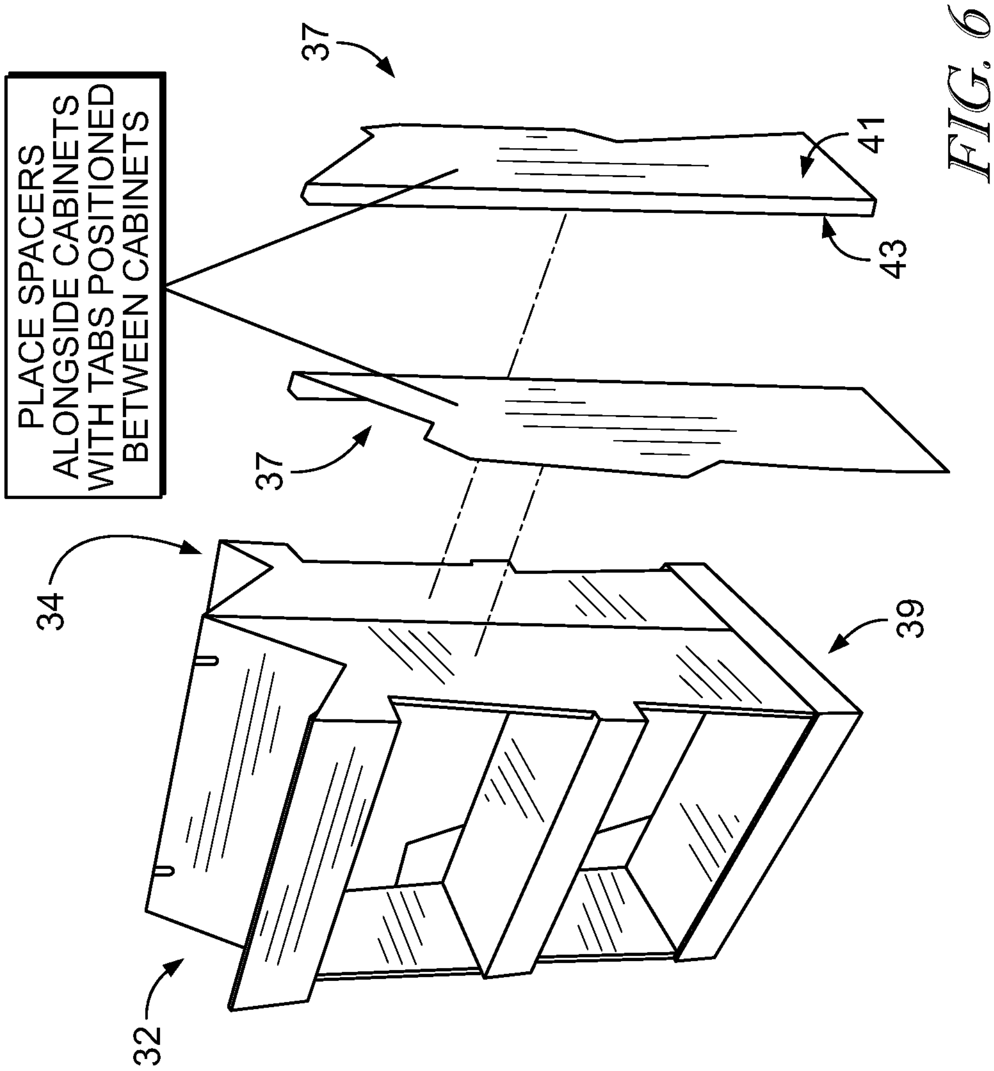
Figure 22:
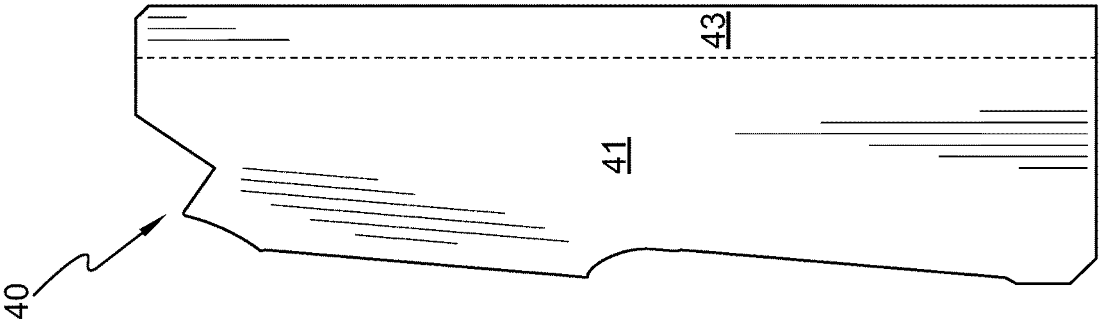
FIG. 22 is a top plan view of an embodiment of a spacer blank in accordance with the present disclosure used to form the spacers of FIG. 2.

Spacers 37 each include a positioner panel 41 and a tab 43 coupled to positioner panel 41 as shown in FIG. 6. Tab 43 is folded relative to positioner panel 41. Spacers 37 are placed along right sides of cabinets 32, 34 with tabs 43 positioned between cabinets 32, 34. Tabs 43 engage with cabinets 32, 34 to space cabinets 32, 34 apart from one another. Additional spacers 37 are positioned along left sides of cabinets 32, 34. Each spacer 37 is formed from a spacer blank 40 shown in FIG. 22.

Figure 7:
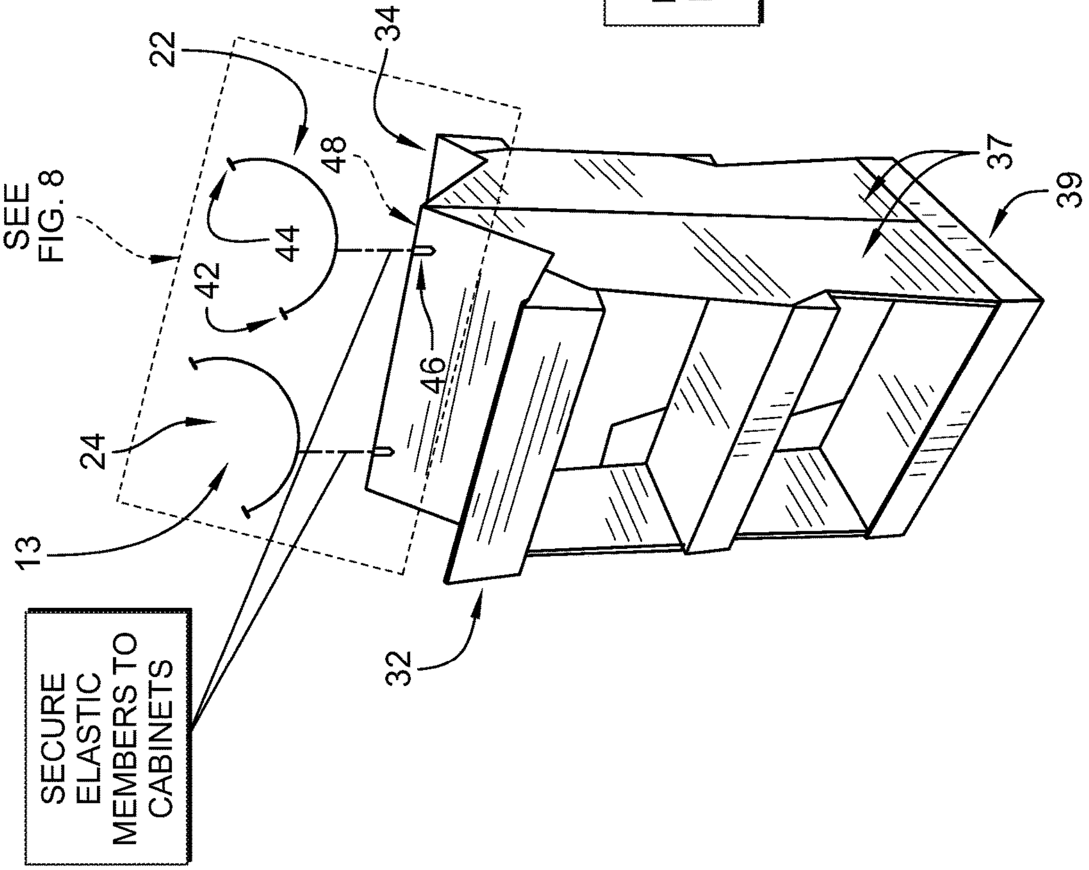
Figure 8:
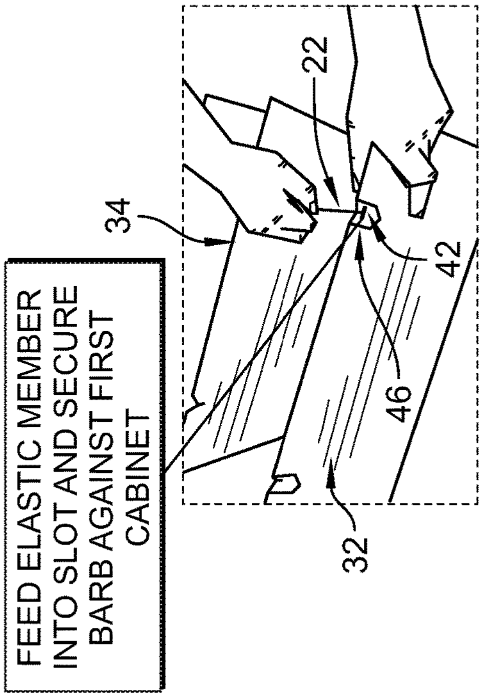
Figure 9:
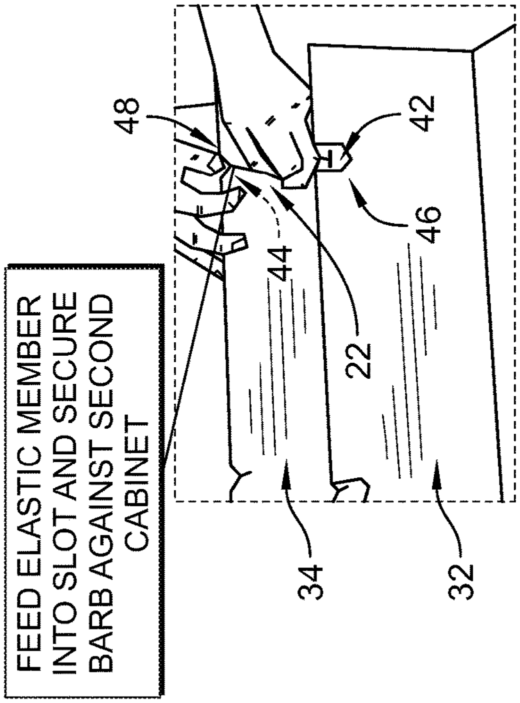

Elastic members 22, 24 are secured to cabinets 32, 34 as suggested in FIGS. 7-9. Each elastic member 22, 24 includes barbs 42, 44 positioned at opposing ends thereof. Elastic member 22 is fed into a slot 46 of first cabinet 32 and barb 42 is secured to first cabinet 32 as suggested in FIG. 8. Elastic member 22 is fed into a slot 48 of second cabinet 34 and barb 44 is secured to second cabinet 34 as suggested in FIG. 9. Elastic member 22 extends between cabinets 32, 34. Elastic member 24 is secured on an opposing side of cabinets 32, 34 in a similar fashion as elastic member 22.

Figure 10:
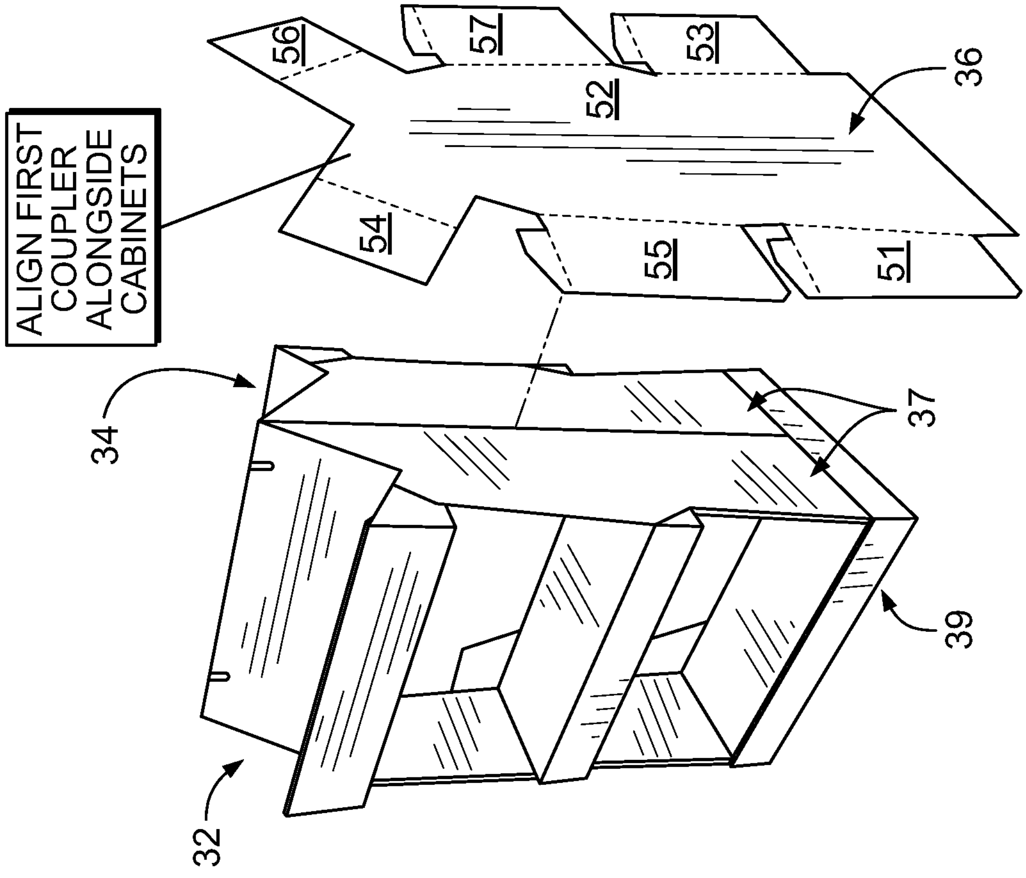
Figure 12:
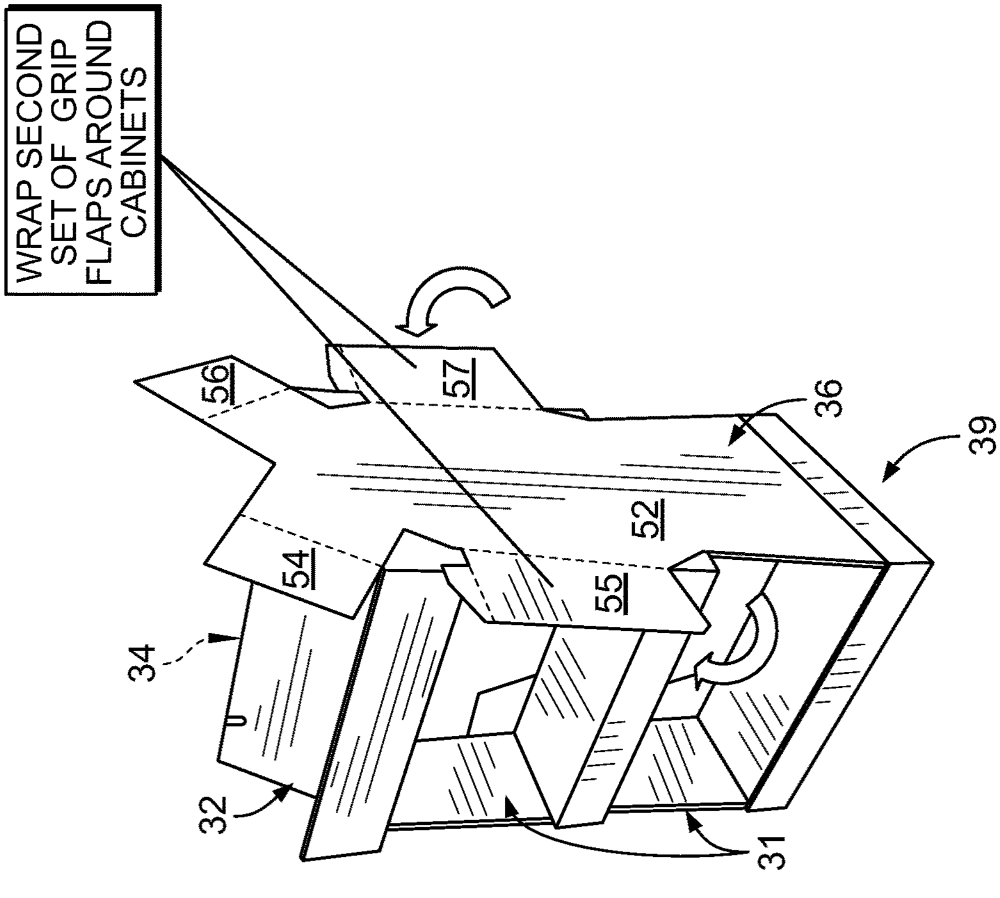
Figure 13:
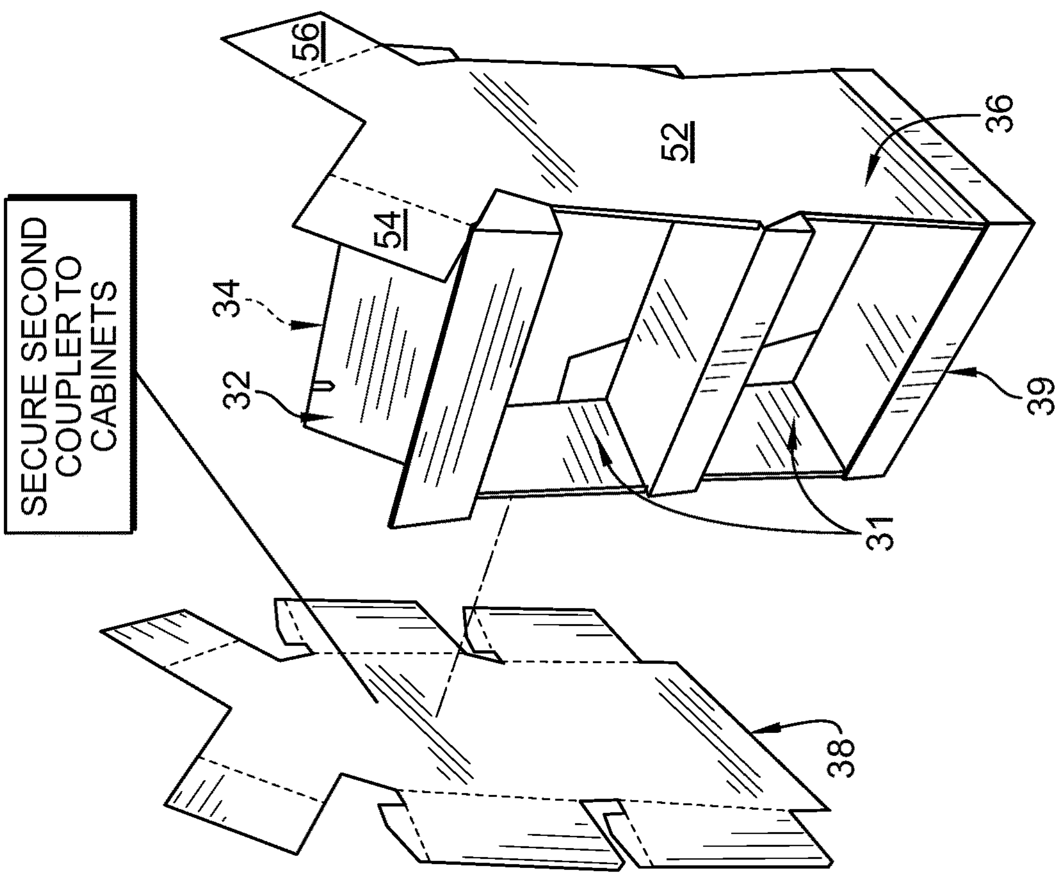
Figure 21:
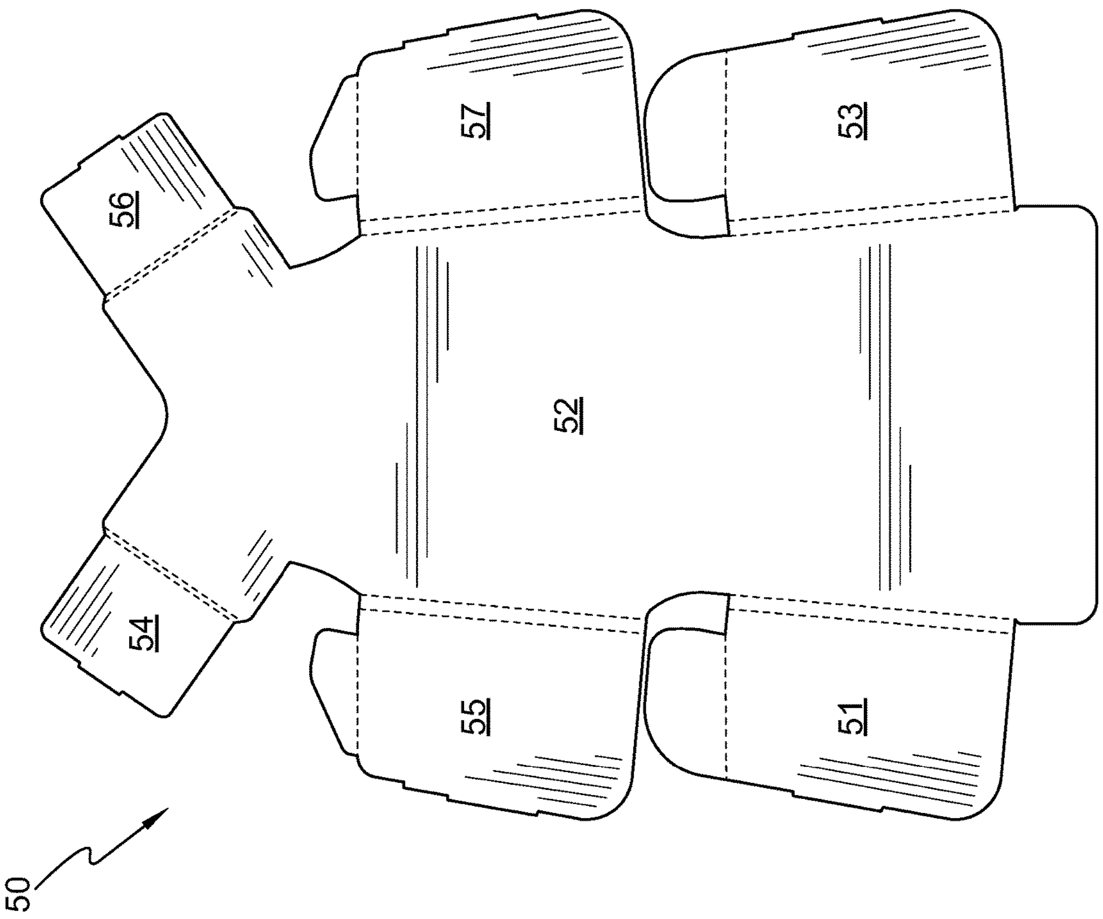
FIG. 21 is a top plan view of an embodiment of a coupler blank in accordance with the present disclosure used to form the couplers of FIG. 2 showing that the coupler includes a display-side panel defining a side of the product display when assembled, grip flaps coupled to the display-side panel to secure the cabinets together, and attachment flaps coupled to the display-side panel to secure containers to the cabinets.

Each coupler 36, 38 includes a display-side panel 52, grip flaps 51, 53, 55, 57 coupled to display-side panel 52, and attachment flaps 54, 56 coupled to display-side panel 52 as suggested in FIG. 10. Display-side panel 52 defines an exterior side of product display 10 when assembled. Grip flaps 51, 53, 55, 57 engage with cabinets 32, 34 to secure cabinets 32, 34 together. Attachment flaps 54, 56 engage with containers 35 to secure containers to cabinets 32, 34. Each coupler 36, 38 is formed from a coupler blank 50 shown in FIG. 21.

Figure 11:
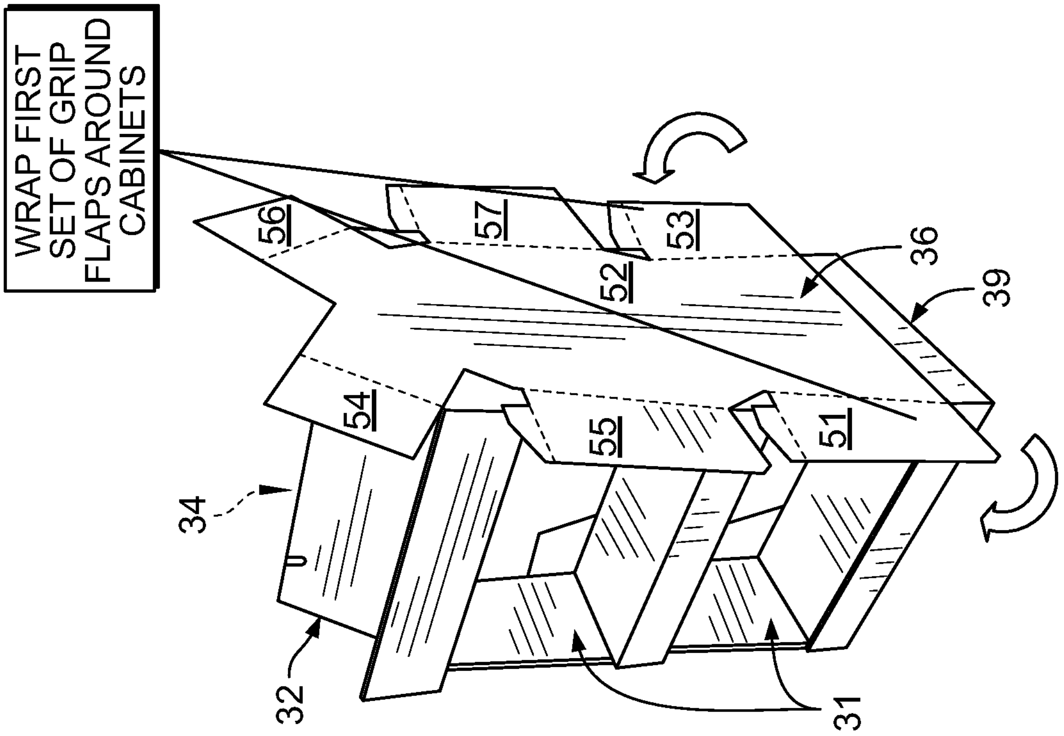

A first coupler 36 is aligned along right side of cabinets 32, 34 as suggested in FIGS. 10 and 11. A lower end of display-side panel 52 is received in base tray 39 as suggested in FIG. 11. A first set of grip flap 51, 53 wrap around cabinets 32, 34 into lower product-storage areas 31. A second set of grip flap 55, 57 wrap around cabinets 32, 34 into upper product-storage areas 31 as suggested in FIG. 12. A second coupler 38 is secured along left sides of cabinets 32, 34 similar to first coupler 36 as suggested in FIGS. 13 and 14.

Figure 15:
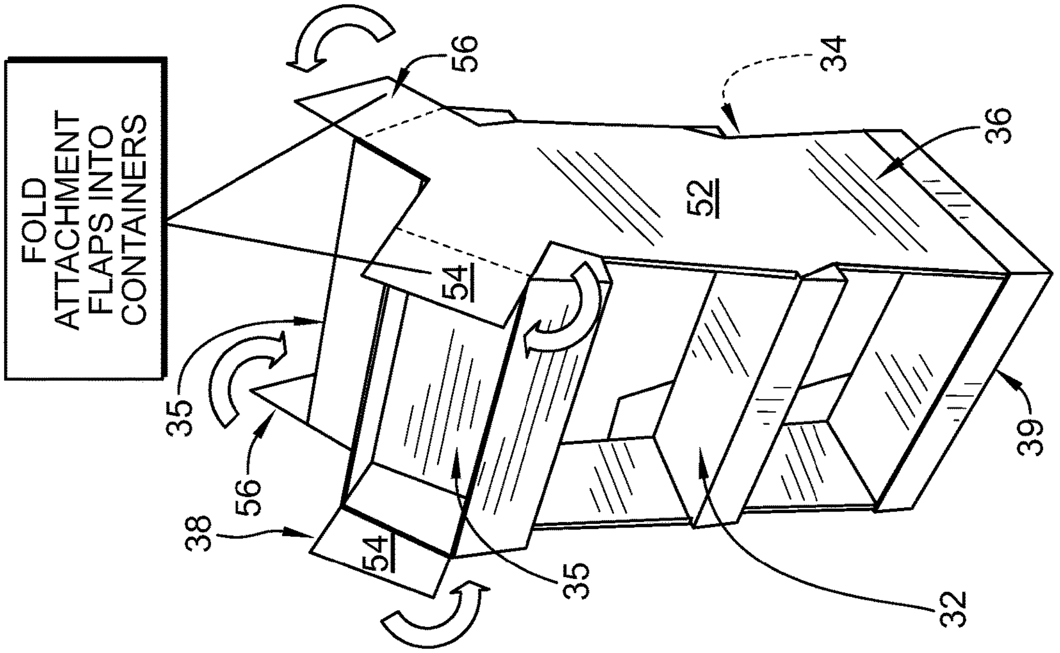
Figure 14:
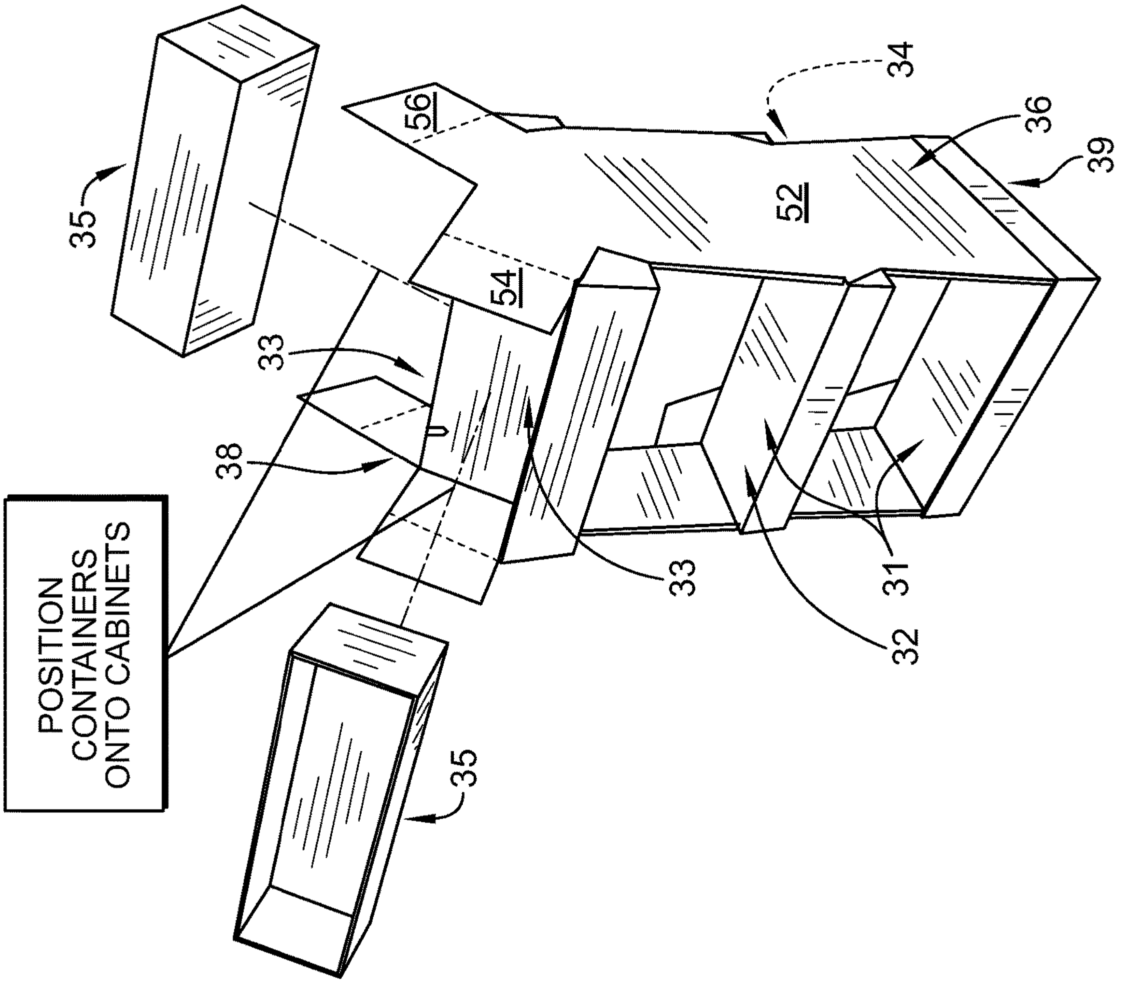
Figure 23:
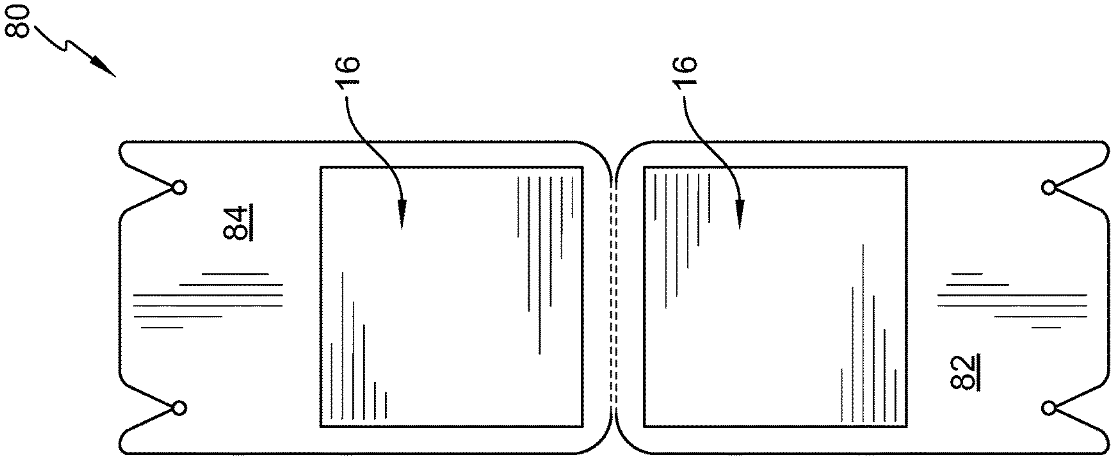
FIG. 23 is a top plan view of an embodiment of a header-board blank in accordance with the present disclosure used to form the header board of FIG. 2.

Containers 35 are received in receptacles 33 of cabinets 32, 34 as suggested in FIGS. 14 and 15. Attachment flaps 54, 56 are folded relative to display-side panels 52 of couplers 36, 38 and into containers 35 to hold containers 35 on cabinets 32, 34 as suggested in FIGS. 15 and 16. Header board 11 is inserted into pocket 20 between cabinets 32, 34 to engage with header mount 13 to form product display 10 as suggested in FIG. 16. Slots 86, 88 of header board 11 engage with elastic members 22, 24. Elastic members 22, 24 of header mount 13 are configured to stretch to allow header board 11 to slide in pocket 20 between the display and shipping positions at the selection of a user. In some embodiments, display header 12 is attached to product-support structure 14 before product is stored in product-support structure 14 and shipped to a retail location. Header board 11 is formed from a header-board blank 80 shown in FIG. 23. Header board blank 80 includes a front panel 82 coupled to a back panel 84 with indicia positioned on both of the front and back panels 82, 84. Front and back panels 82, 84 fold relative to one another for form header board 11.

Figure 18:
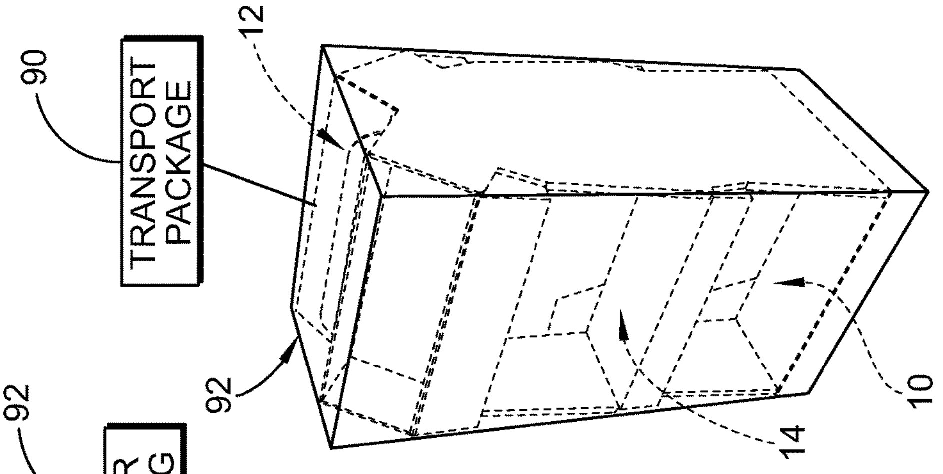
FIGS. 17-18 are a series of views showing a process in accordance with the present disclosure for forming a transport package by positioning an outer casing relative to the product display.
Figure 17:
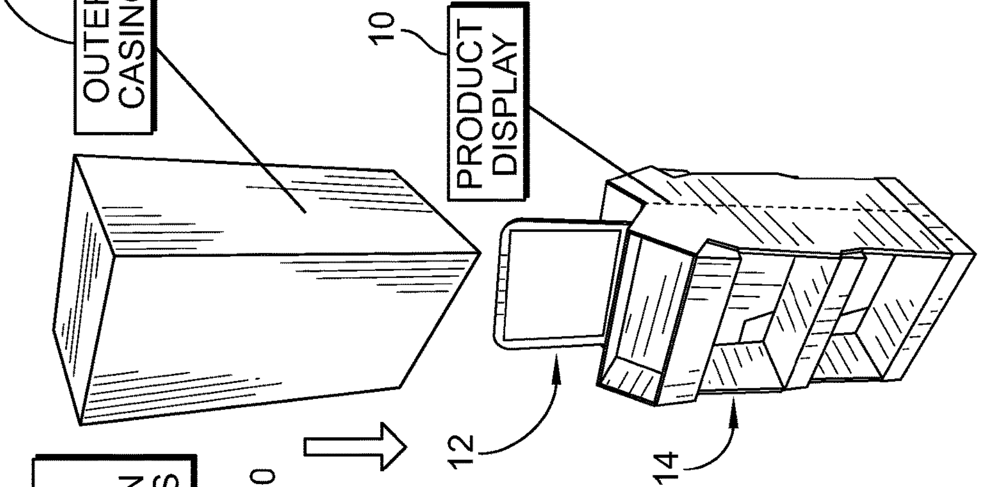
Figure 16:
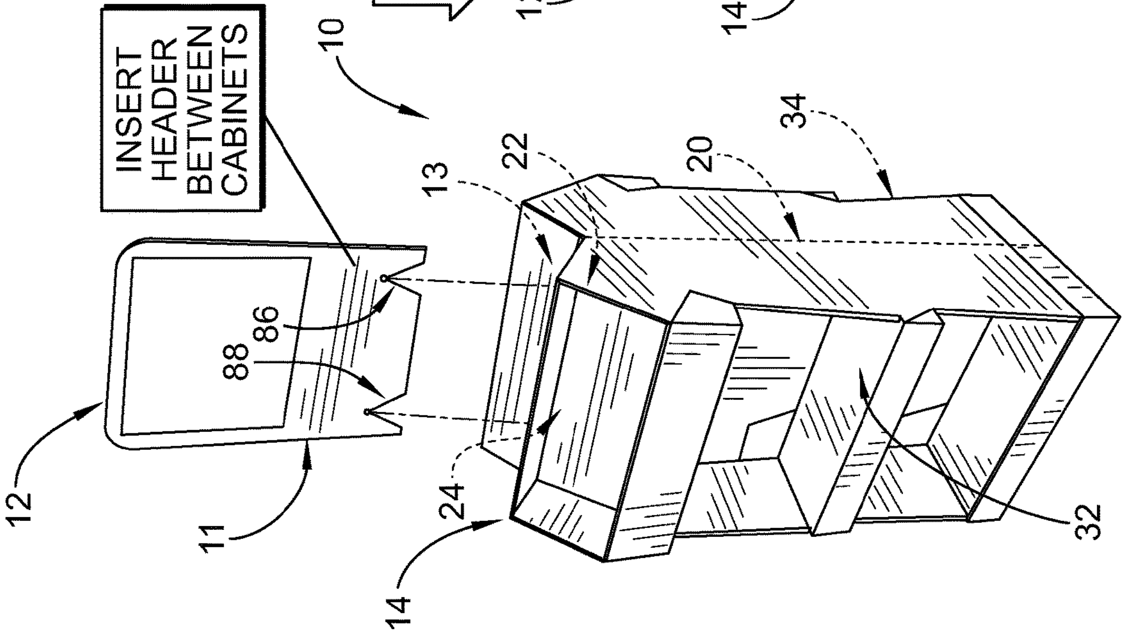

One illustrative process for assembling a transport package 90 is shown in FIGS. 17 and 18. An outer casing 92 is sized to receive product display 10 therein. Outer casing 92 is positioned to surround product display 10 to form transport package 90 and retain the product on product-support structure 14. Outer casing 92 moves display header 12 from the display position to the shipping position and holds display header 12 in the shipping position during transit of product display 10 to a retail location. A user of product display 10 removes outer casing 92 to expose the product stored in product-support structure 14 and header mount 13 moves header board 11 to the display position for showing product indicia 16 to customers at the retail location.

Figure 19:
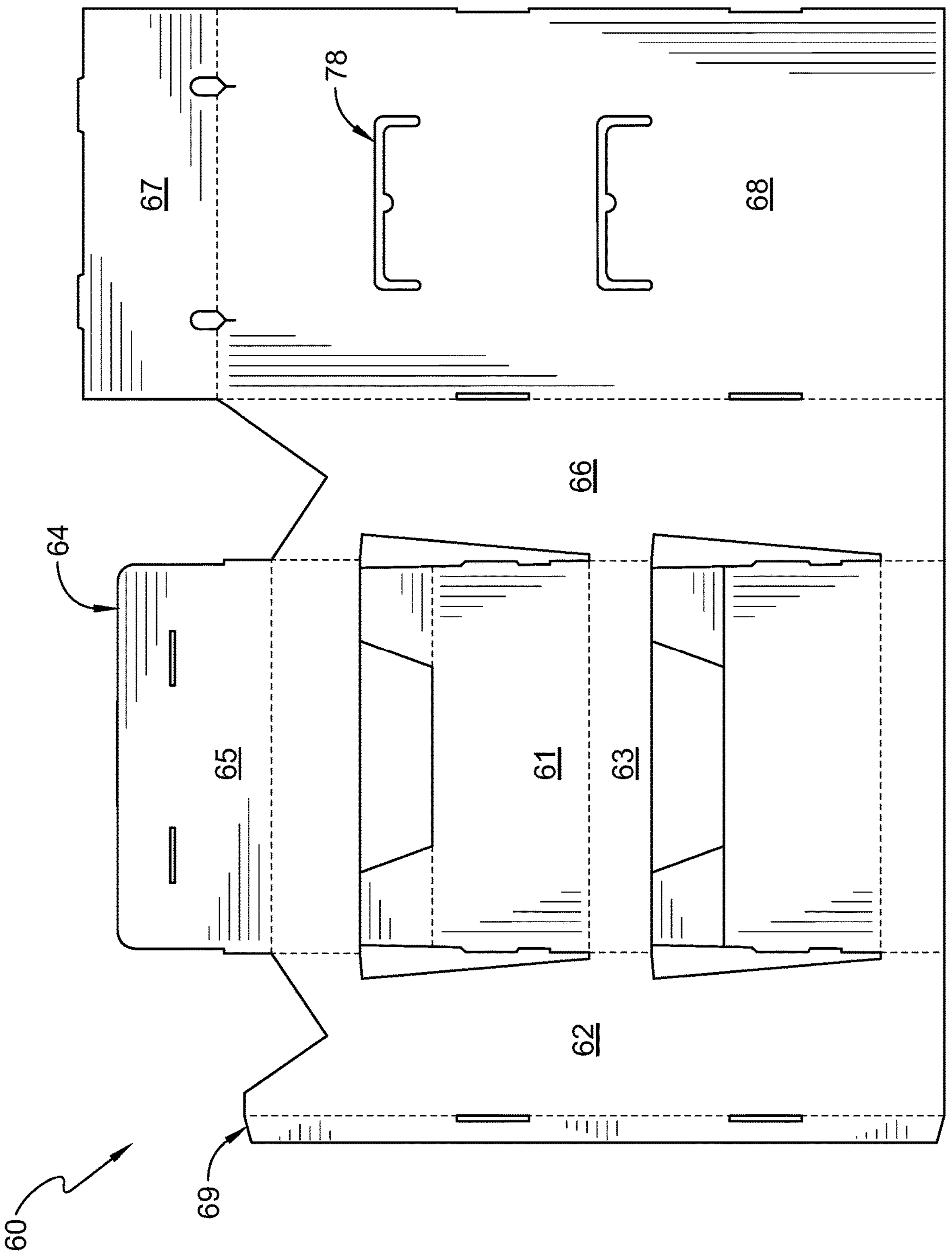
FIG. 19 is a top plan view of an embodiment of a body blank in accordance with the present disclosure used to form a body of the cabinets of FIG. 2 showing that the body blank includes sidewall panels, a back wall panel, and a body shelf-part strip defining a plurality of second shelf parts and suggesting that the panels and strip fold relative to one another to form a tubular body.
Figure 20:
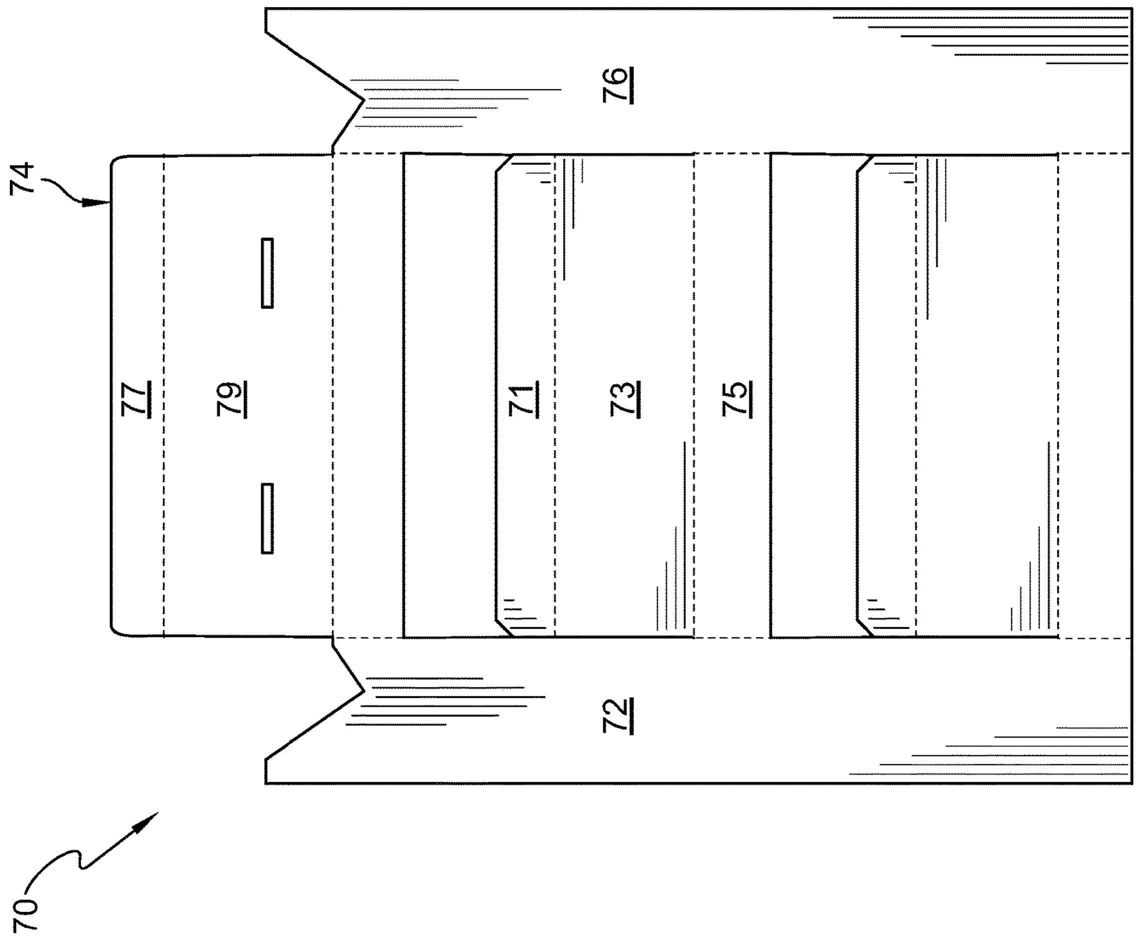
FIG. 20 is a top plan view of an embodiment of an insert blank in accordance with the present disclosure used to form an insert of the cabinets of FIG. 2 showing that the insert blank includes spacer panels and an insert shelf-part strip defining a plurality of first shelf parts and suggesting that the spacer panels and strip fold relative to one another to form the insert.

Blanks 60, 70 used to form cabinets 32, 34 are shown in FIGS. 19 and 20. Cabinets 32, 34 are formed as a result of coupling an insert with a tubular body. The body is formed by erecting a body blank 60, and the insert is formed by erecting an insert blank 70. Blanks 60, 70 are made, for example, of corrugated material. As shown and described herein, when making reference to a blank of material, solid lines denote a cut line where adjacent portions of material are severed from one another and dashed lines denote a fold line where portions of material are folded relative to one another. In some examples, fold lines are scored or perforated.

Body blank 60 includes two sidewall panels 62, 66 coupled to a body shelf-part strip 64, and a back wall panel 68 coupled to sidewall panel 66 as shown in FIG. 19. In some embodiments, back wall panel 68 is coupled to sidewall panel 62. Body shelf-part strip 64 is formed to define a plurality of second shelf parts 61 corresponding to a number of product-storage areas 31 in the assembled cabinet 32, 34. Body shelf-part strip 64 is also formed to define a cover flap 65 used to form a portion of receptacle 33. A brace flap 67 is coupled to back wall 68 and engages with cover flap 65 used to form a portion of receptacle 33. Back wall panel 68 is formed to include a plurality of slots 78. Sidewall panels 62, 66 provide lateral walls of the body, body shelf-part strip 64 provides a front wall of the body, and back wall panel 68 provides a back wall of the body. Panels 62, 66, 68 and body shelf-part strip 64 fold relative to one another to form the body, and a retainer flap 69 engages with panel 68 to retain the body in a folded position. In some embodiments, an adhesive material couples retainer flap 69 to panel 68.

Insert blank 70 includes spacer panels 72, 76 coupled to an insert shelf-part strip 74 as shown in FIG. 20. Insert shelf-part strip 74 is formed to define a plurality of first shelf parts 73. Insert shelf-part strip 74 is also formed to define a base flap 79 used to form a portion of receptacle 33. A support tab 71 is coupled to each first shelf part 73, and each first shelf part 73 is coupled to a support wall band 75 along an opposing edge thereof. A support tab 77 is coupled to base flap 79, and base flap 79 is coupled to a support wall band 75 along an opposing edge thereof. Panels 72, 76 and insert shelf-part strip 74 fold relative to one another to form the insert.

Each second shelf part 61 of body shelf-part strip 64 is coupled to a front wall band 63 as shown in FIG. 19. Back wall panel 68 is formed to include slots 78. Slots 78 are configured to receive support tabs 71, 77 of first shelf part 73 and base flap 79 to support first shelf part 73 and base flap 79 relative to back wall panel 68. Base flap 79 cooperates with cover flap 65 and brace flap 67 to form receptacle 33.

Figure 24:
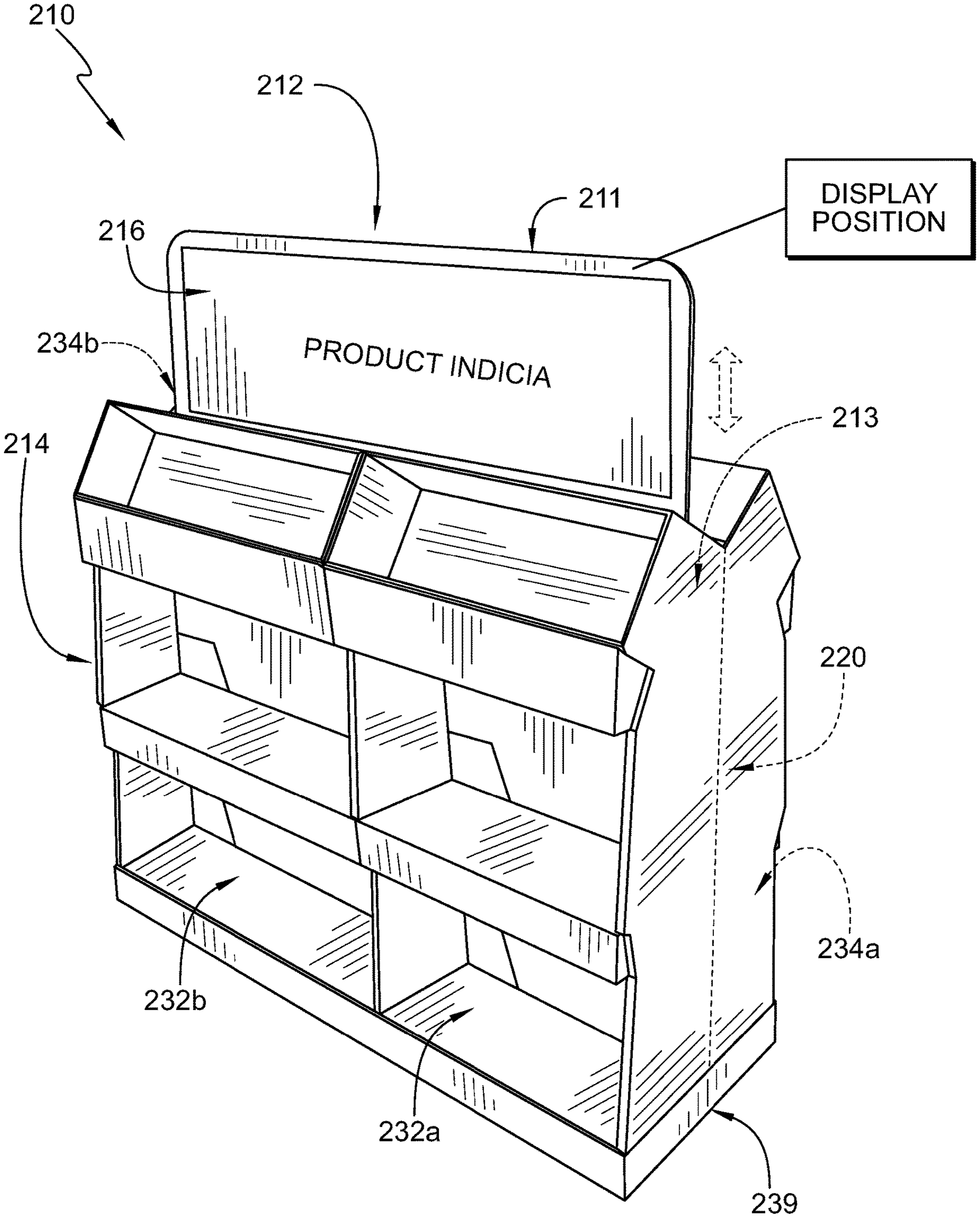
FIG. 24 is a perspective view of another embodiment of a product display in accordance with the present disclosure.

Another embodiment of a product display 210 in accordance with the present disclosure is shown in FIG. 24. Product display 210 includes a display header 212 coupled to a product-support structure 214. Product display 210 is similar to product display 10 with one difference being that four cabinets 232*a*, 232*b*, 234*a*, 234*b* are used in product-support structure 214. For example, product display 10 may be ¼ pallet sized, and product display 210 may be half-pallet sized. In some embodiments, a product display is formed in a full-pallet size.

Display header 212 includes a header board 211 and a header mount 213 coupled to product-support structure 214 to support header board 211 for movement relative to product-support structure 214 as suggested in FIG. 24. In the illustrative embodiment, header board 211 extends between both sets of cabinets 232*a*, 232*b*, 234*a*, 234*b*. A base tray 239 is sized to receive cabinets 232*a*, 232*b*, 234*a*, 234*b*.

Figure 25:
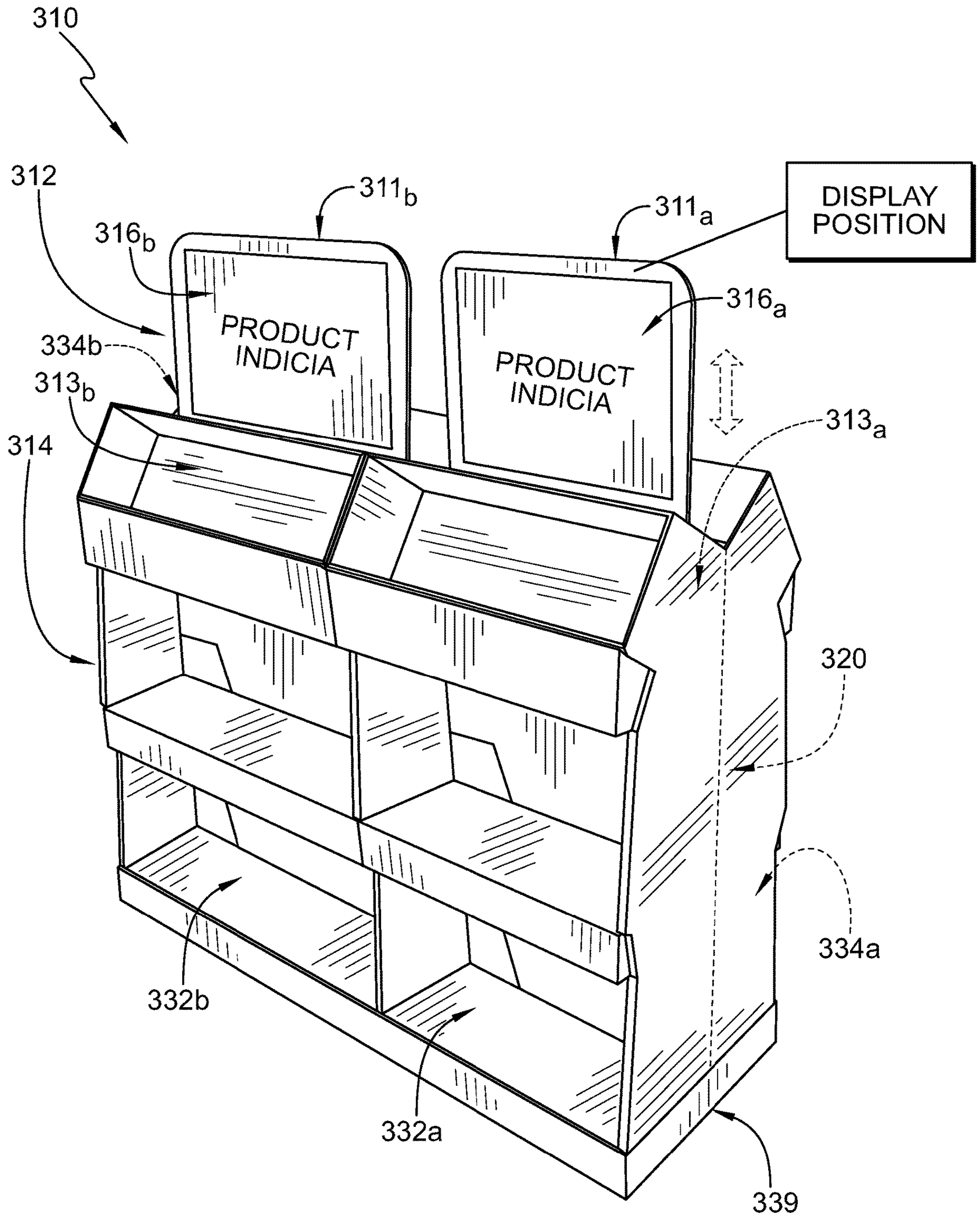
FIG. 25 is a perspective view of another embodiment of a product display in accordance with the present disclosure.

Another embodiment of a product display 310 in accordance with the present disclosure is shown in FIG. 25. Product display 310 includes a display header 312 coupled to a product-support structure 314. Product display 310 is similar to product display 10 with one difference being that four cabinets 332*a*, 332*b*, 334*a*, 334*b* are used in product-support structure 314. For example, product display 10 may be ¼ pallet sized, and product display 310 may be half-pallet sized. In some embodiments, a product display is formed in a full-pallet size.

Display header 312 includes header boards 311*a*, 311*b* and header mounts 313*a*, 313*b* coupled to product-support structure 314 to support header boards 311*a*, 311*b*, respectively, for movement relative to product-support structure 314 as suggested in FIG. 25. In the illustrative embodiment, header board 311*a* extends between cabinets 332*a*, 334*a* and header board 311*b* extends between cabinets 332*b*, 334*b*. A base tray 339 is sized to receive cabinets 332*a*, 332*b*, 334*a*, 334*b*.

Figure 26:
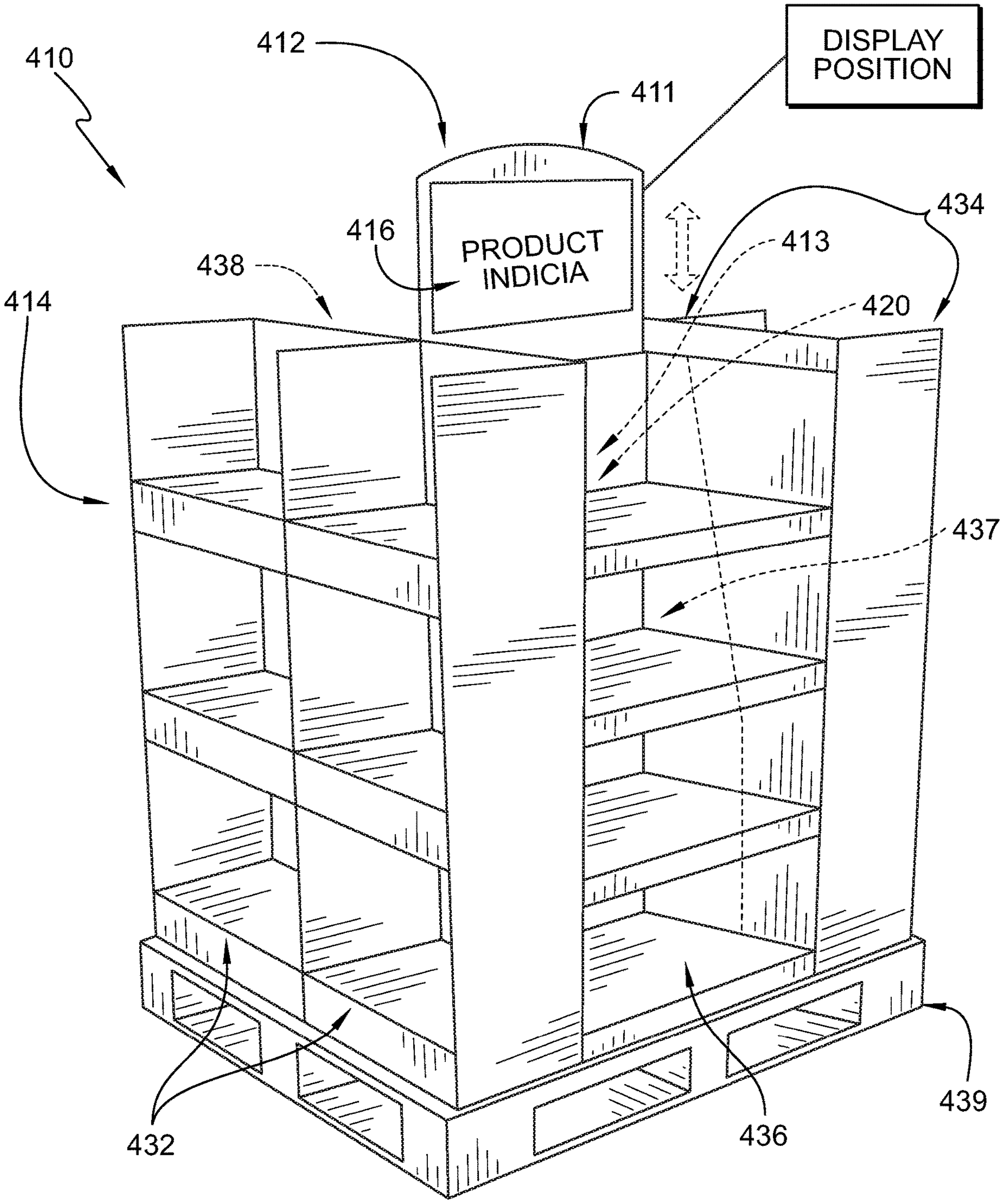
FIG. 26 is a perspective view of another embodiment of a product display in accordance with the present disclosure showing that the product display includes a display header positioned within a product-support structure for showing product indicia related to products stored in the product-support structure to a customer at a retail location when the display header is in a display position.

Another embodiment of a product display 410 in accordance with the present disclosure is shown in FIG. 26. Product display 410 includes a display header 412 positioned within a product-support structure 414 as suggested in FIG. 27. Product-support structure 414 is configured to support product for display in a retail setting. Product indicia 416 related to products stored in product-support structure 414 is positioned on a front side and back side of display header 412 and visible when display header 412 is in a display position as shown in FIG. 26.

Display header 412 includes a header board 411 and a header mount 413 coupled to an H-frame 437 to support header board 411 for movement relative to product-support structure 414 between the display position, as shown in FIG. 26, and a shipping position at the selection of a user. At least a portion of product indicia 416 is obscured from view when header board 411 is in the shipping position and a height of product display 410 is reduced compared to when header board 411 is in the display position. Header mount 413 biases header board 411 toward the display position to support the header board 411 in the display position for showing product indicia 416 to customers at a retail location as shown in FIG. 26.

Figure 27:
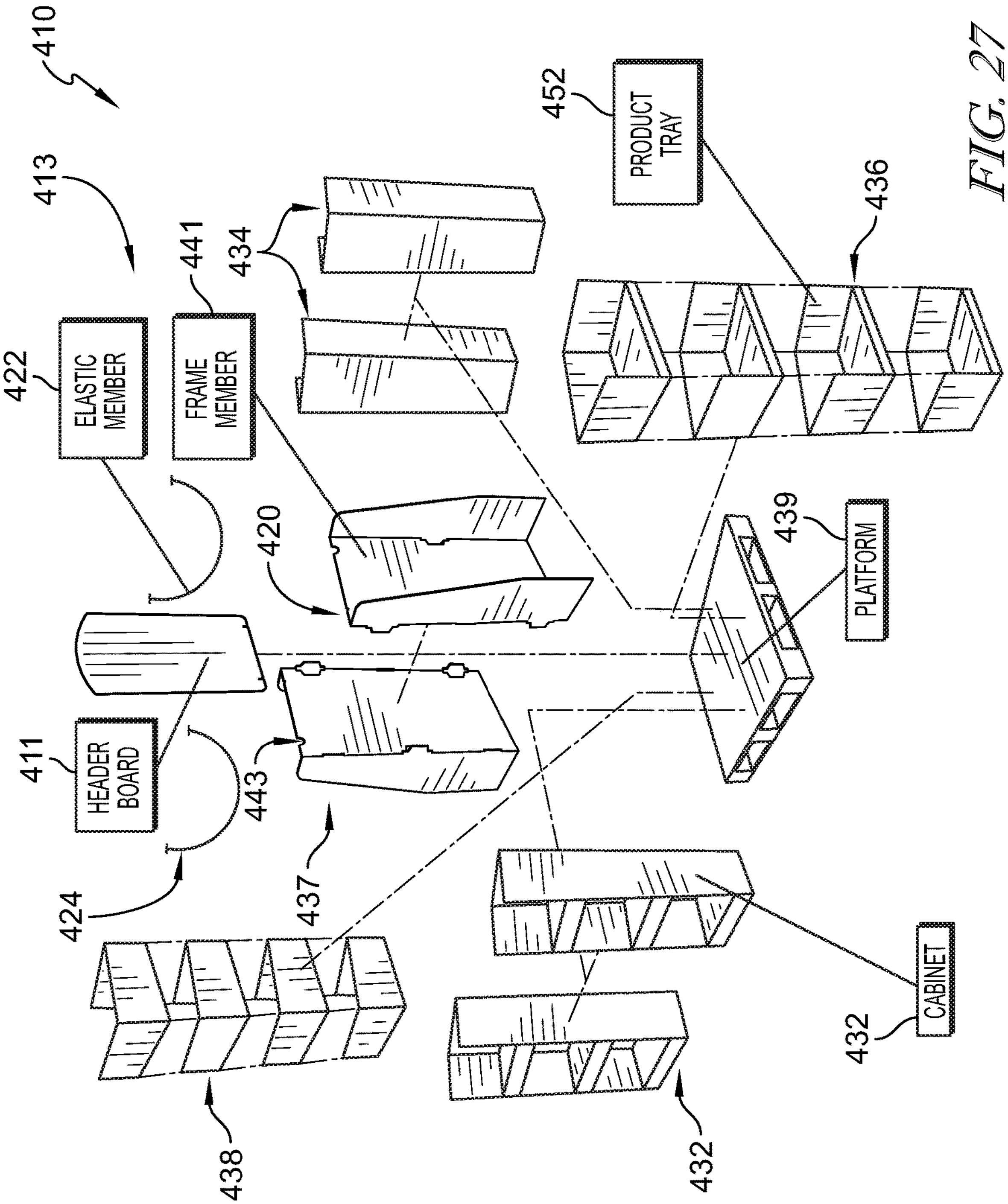
FIG. 27 is an exploded assembly view of the product display of FIG. 26 showing that the product-support structure includes an H-frame, cabinets, and product trays and suggesting that the H-frame aligns the cabinets and product trays relative to a platform.

Header board 411 is received in a pocket 420 of H-frame 437 as suggested in FIG. 27. Pocket 420 locates header board 411 relative to product-support structure 414 and is configured to guide header board 411 between the display and shipping positions. Pocket 420 and header board 411 are aligned with a front-side tray-stack 436 and a back-side tray-stack 438 of product-support structure 414 where product is stored as suggested in FIG. 26, but other orientations for pocket 420 and header board 411 are contemplated by the present disclosure.

In the illustrative embodiment, product-support structure 414 includes a left-side pair of cabinets 432, an opposingly faced right-side pair of cabinets 434, and the front-side and back-side tray-stacks 436, 438 as shown in FIG. 27. Each tray-stack 436, 438 includes a plurality of product trays 452 stacked onto one another. Each cabinet 432, 434 is formed to define product-storage areas for storing products for display. Each product tray 452 is formed to define a product-storage area for storing products for display.

Figure 28:
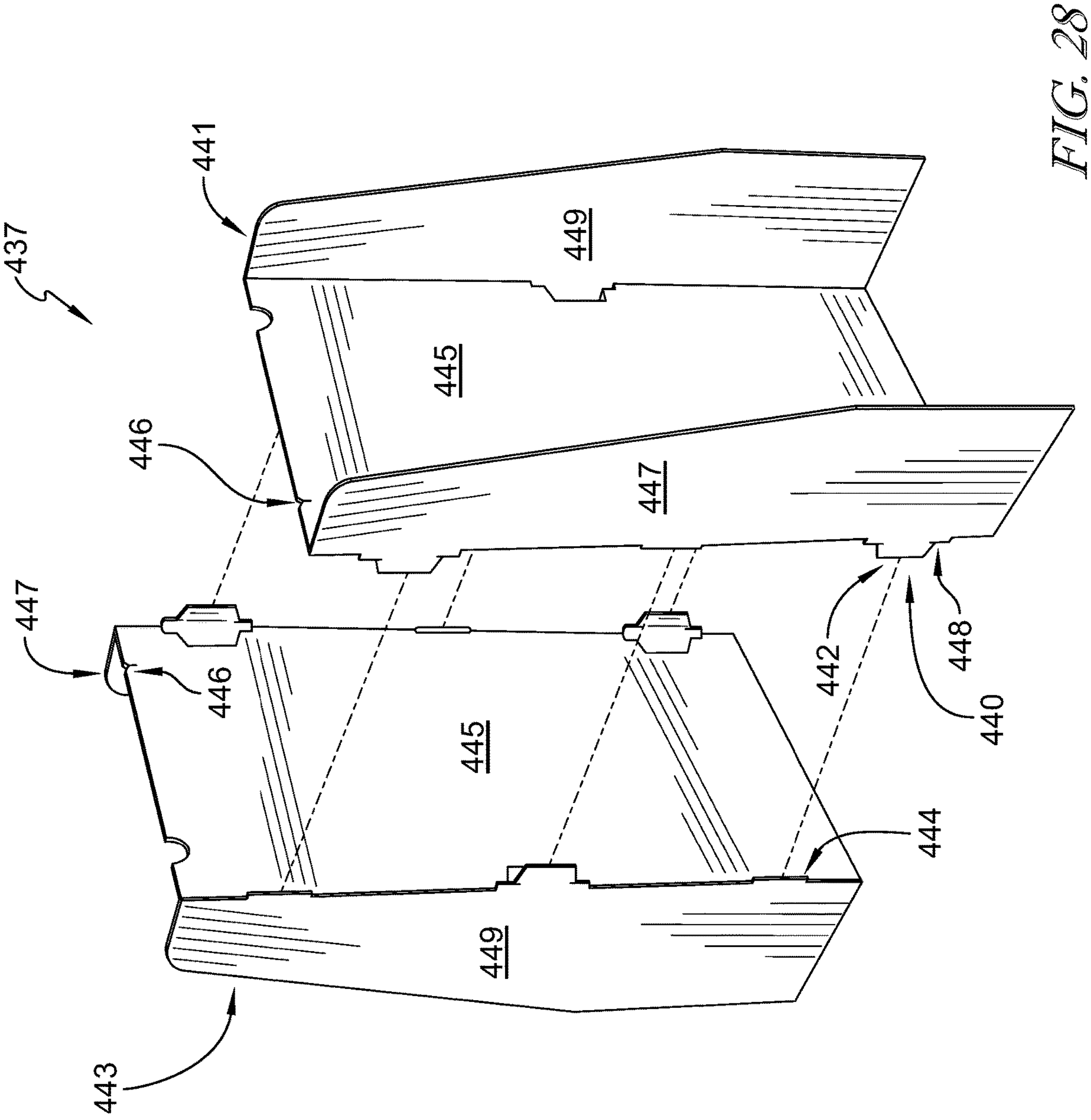
FIG. 28 is an exploded assembly view of the H-frame of FIG. 27 showing that the H-frame includes a pair of opposingly faced frame members and suggesting that lock tabs of each frame member are received in slots of the other frame member to hold the H-frame together.
Figure 32:
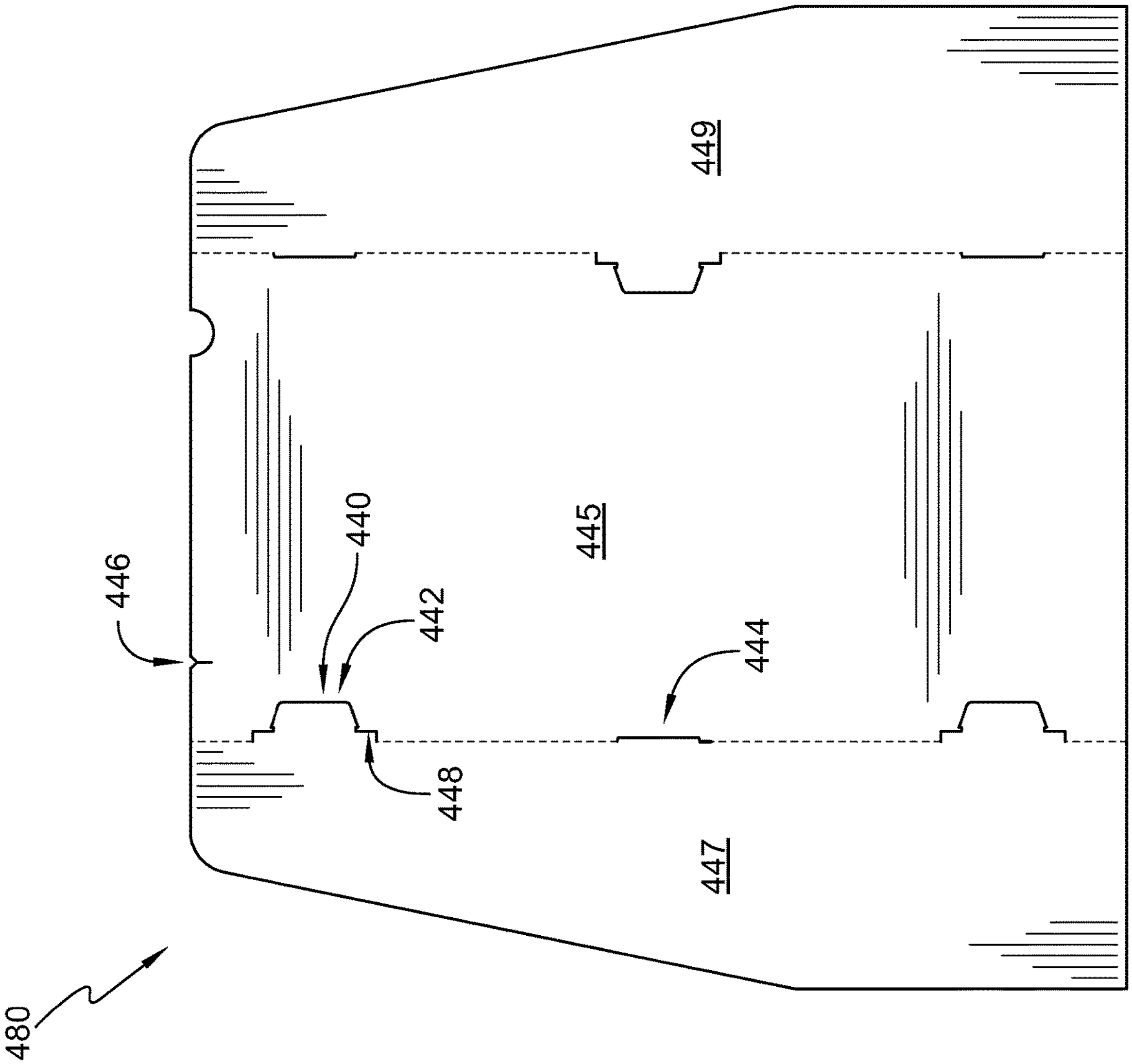
FIG. 32 is a top plan view of an embodiment of a frame-member blank in accordance with the present disclosure used to form the frame members of FIG. 29 showing that the frame-member blank includes a guide panel and alignment panels coupled along opposing sides of the guide panel.

H-frame 437 of product-support structure 414 includes a pair of opposingly faced frame members 441, 443 as shown in FIG. 27. Frame members 441, 443 come together to define pocket 420 for receiving header board 411. Each frame member 441, 443 includes a guide panel 445 and alignment panels 447, 449 coupled along opposing sides of guide panel 445 as shown in FIG. 28. Alignment panels 447, 449 engage with cabinets 432, 434 and tray-stacks 436, 438 to align the components of product-support structure 414 on a platform 439. Platform 439 assists in holding the components of product-support structure 414 together and for supporting product-support structure 414 during transport. Each frame member 441, 443 is formed from a frame-member blank 480 shown in FIG. 32.

Each frame member 441, 443 includes a plurality of complimentary connectors 440 and slots 444 that engage with one another to hold frame members 441, 443 together as suggested in FIG. 28. Each connector 440 includes a lock tab 442 and one or more spacers 448. Lock tabs 442 are received through slots 444 to hold H-frame 437 together, and spacers 448 maintain a gap between frame members 441, 443 to define pocket 420. Guide panels 445 and connectors 440 define pocket 420.

Figures 29, 30, 31:
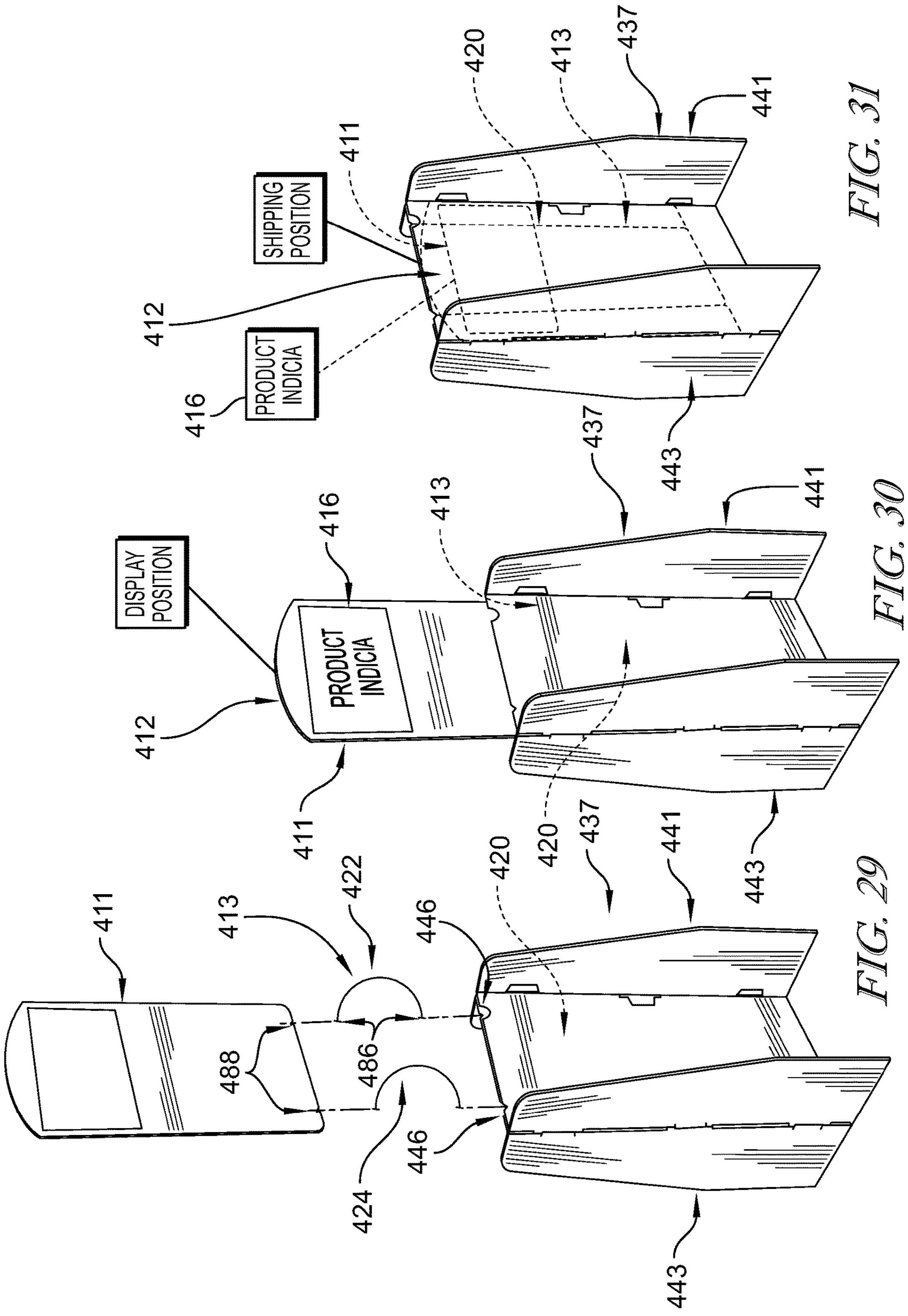
FIG. 29 is a perspective view of the H-frame of FIG. 28 showing that the display header includes a header board and elastic members and suggesting that the elastic members engage with the header board and the H-frame to support the header board.
FIG. 30 is a view similar to FIG. 29 showing the header board received in a pocket defined between the frame members of the H-frame and suggesting that the elastic members are biasing the header board toward the display position.
FIG. 31 is a view similar to FIG. 30 showing the header board in a shipping position and suggesting that the header board slides in the pocket of the H-frame to obscure at least a portion of the product indicia when the header board is moved to the shipping position.

Header mount 413 includes a pair of elastic members 422, 424 that engage with frame members 441, 443 and header board 411 to support header board 411 on H-frame 437 as suggested in FIG. 29. In some embodiments, elastic members 422, 424 are formed as elongated strands of stretchable material, and the number of elastic members 422, 424 can be increased or decreased to adjust for size, weight, display position height, etc. of display header 412. Each elastic member 422, 424 includes barbs 486 positioned at opposing ends thereof. One end of elastic members 422, 424 are fed into slots 446 of H-frame 437 with an opposing end of elastic members 422, 424 being fed into slots 488 of header board 411. Barbs 486 engage with header board 411 and H-frame 437. Elastic members 422, 424 are configured to stretch to allow header board 411 to slide in pocket 420 between the display and shipping positions at the selection of a user as suggested in FIGS. 30 and 31. In some embodiments, display header 412 is positioned within product-support structure 414 before product is stored in product-support structure 414 and shipped to a retail location.

In some embodiments, product display 410 can be combined with an outer cover to form a transport package to retain the product on product-support structure 414 during shipping. The outer casing moves display header 412 from the display position to the shipping position and holds display header 412 in the shipping position during transit of product display 410 to a retail location. A user of product display 410 removes the outer casing to expose the product stored in product-support structure 414 and header mount 413 moves header board 411 to the display position for showing product indicia 416 to customers at the retail location.

Figure 33:
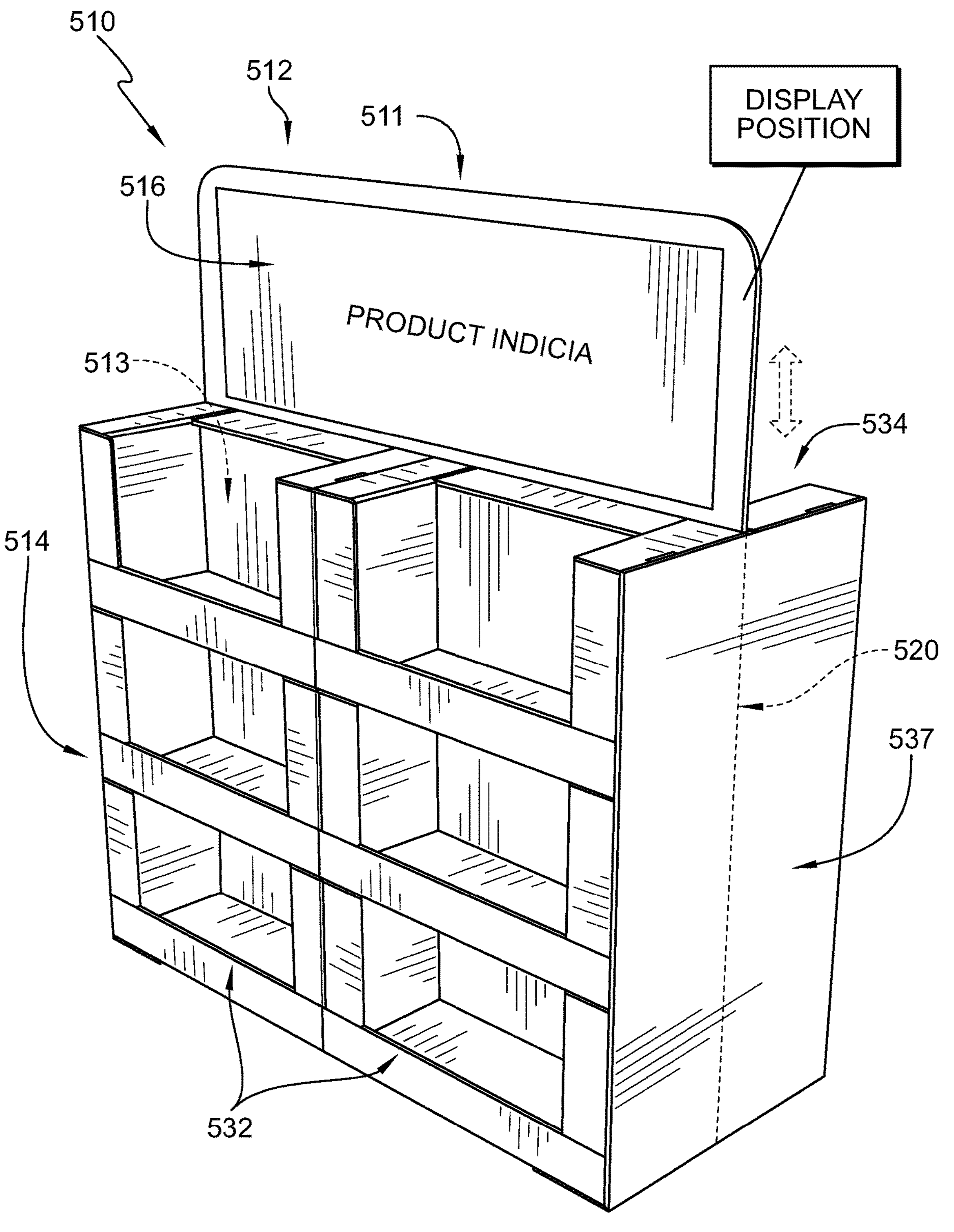
FIG. 33 is a perspective view of another embodiment of a product display in accordance with the present disclosure showing that the product display includes a display header positioned within a product-support structure for showing product indicia related to products stored in the product-support structure to a customer at a retail location when the display header is in a display position.

Another embodiment of a product display 510 in accordance with the present disclosure is shown in FIG. 33. Product display 510 includes a display header 512 positioned within a product-support structure 514. Product-support structure 514 is configured to support product for display in a retail setting. Product indicia 516 related to products stored in product-support structure 514 is positioned on a front side and back side of display header 512 and visible when display header 512 is in a display position as shown in FIG. 33.

Display header 512 includes a header board 511 and a header mount 513 coupled to an H-frame 537 to support header board 511 for movement relative to product-support structure 514 between the display position, as shown in FIG. 33, and a shipping position at the selection of a user. At least a portion of product indicia 516 is obscured from view when header board 511 is in the shipping position and a height of product display 510 is reduced compared to when header board 511 is in the display position. Header mount 513 biases header board 511 toward the display position to support the header board 511 in the display position for showing product indicia 516 to customers at a retail location.

Header board 511 is received in a pocket 520 of H-frame 537 as suggested in FIG. 33. Pocket 520 locates header board 511 relative to product-support structure 514 and is configured to guide header board 511 between the display and shipping positions. Pocket 520 and header board 511 are aligned with front-side display vehicles 532 and back-side display vehicles 534 of product-support structure 514 where product is stored as suggested in FIG. 33, but other orientations for pocket 520 and header board 511 are contemplated by the present disclosure.

In the illustrative embodiment, product-support structure 514 includes front-side and back-side display vehicles 532, 534 aligned relative to H-frame 537 as shown in FIG. 33. Display vehicles 532, 534 can be any type of display vehicle, such as cabinets, risers, stacked trays, three-sided structures, and other structures that support or otherwise store product for display and transportation. Each display vehicle 532, 534 is formed to define product-storage areas for storing products for display.

Figure 34:
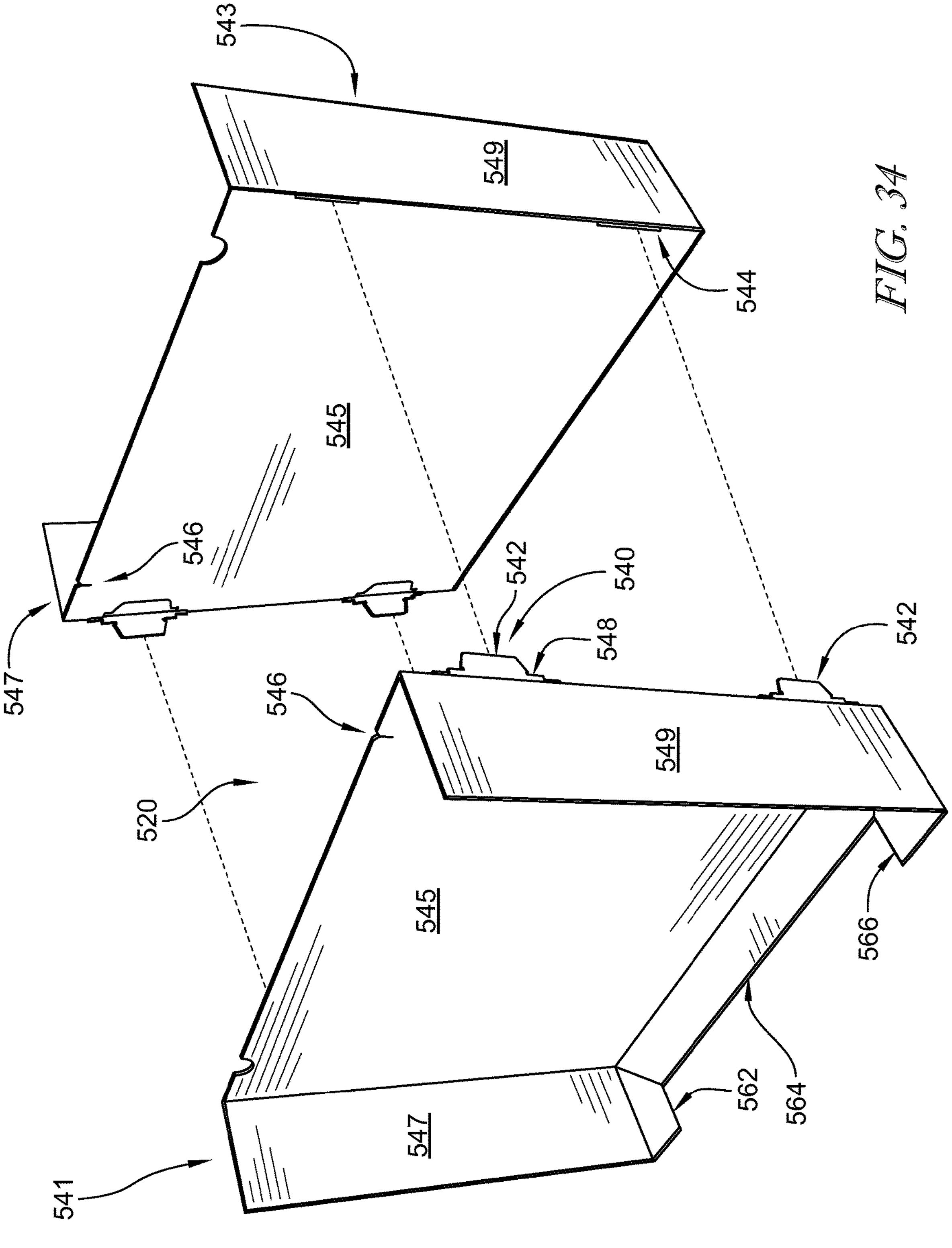
FIGS. 34-36 are a series of views showing a process in accordance with the present disclosure for assembling an H-frame of the product-support structure.

H-frame 537 of product-support structure 514 includes a pair of opposingly faced frame members 541, 543 as shown in FIG. 34. Frame members 541, 543 come together to define pocket 520 for receiving header board 511 as suggested in FIG. 35. Each frame member 541, 543 includes a guide panel 545, alignment panels 547, 549 coupled along opposing sides of guide panel 545, and alignment flaps 562, 564, 566 coupled to lower portions of panels 545, 547, 549. Alignment panels 547, 549 and alignment flaps 562, 564, 566 engage with display vehicles 532, 534 to align the components of product-support structure 514. In some embodiments, a platform assists in holding the components of product-support structure 514 together and for supporting product-support structure 514 during transport.

Figure 35:
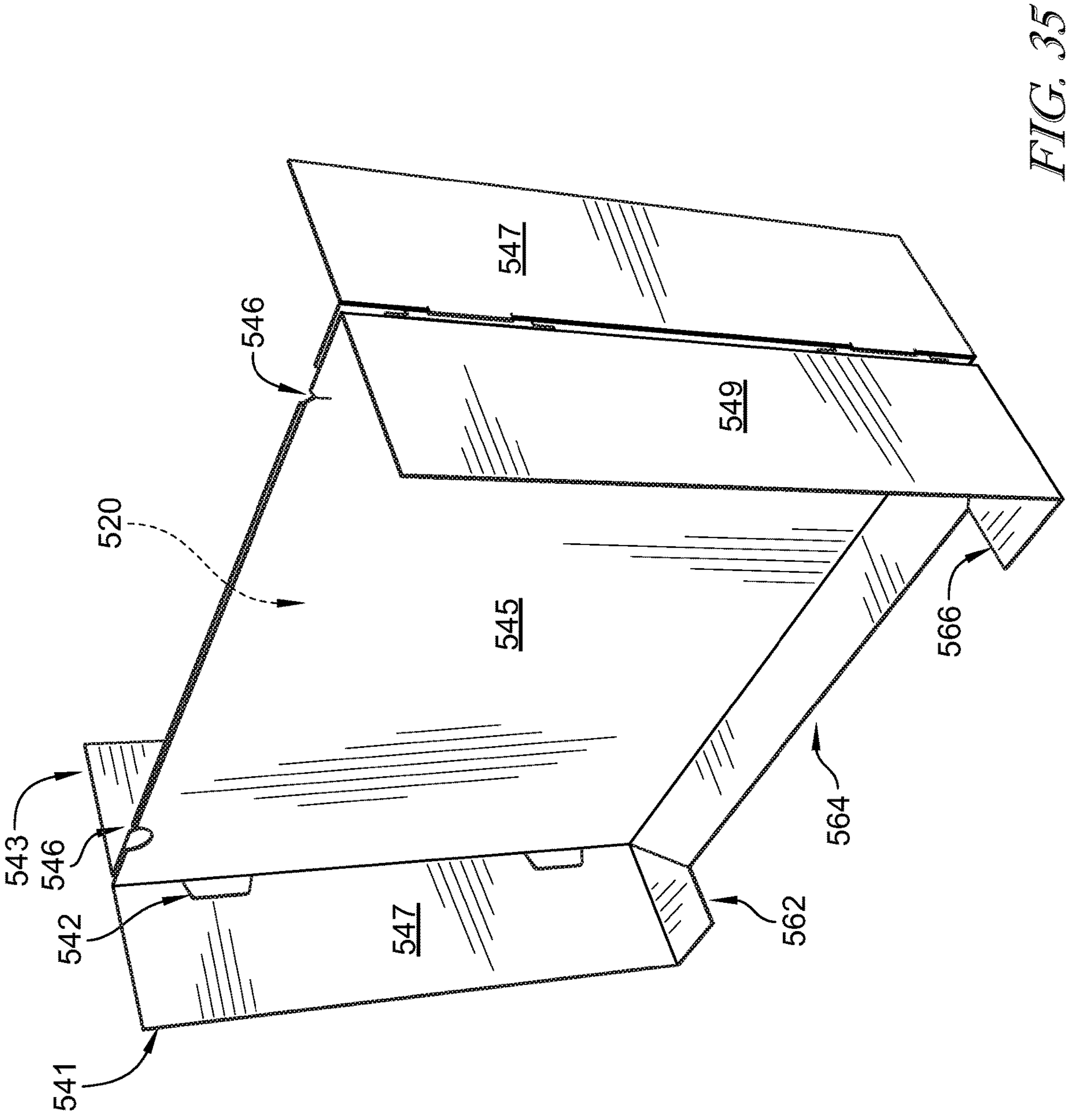
Figure 40:
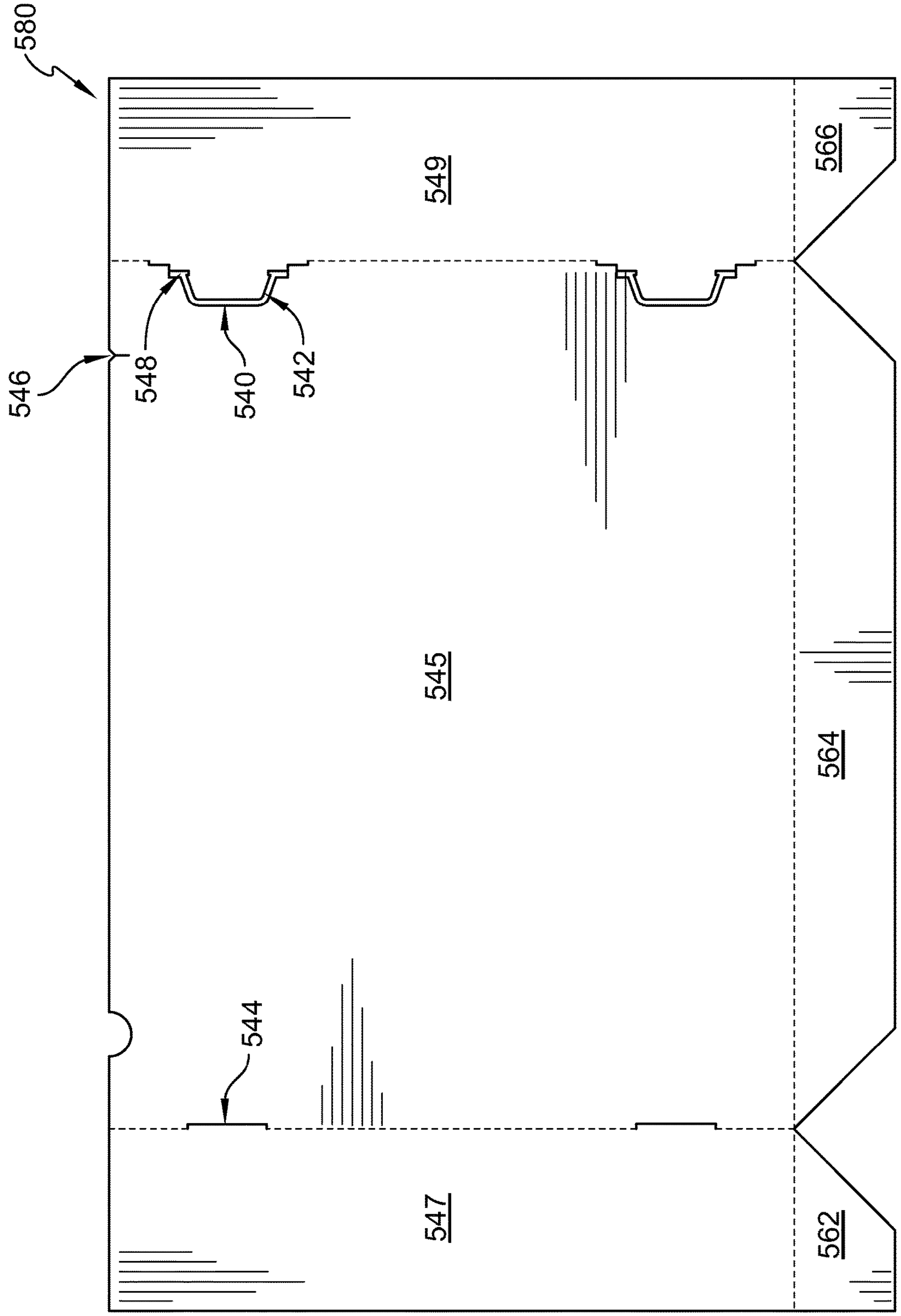
FIG. 40 is a top plan view of an embodiment of a frame-member blank in accordance with the present disclosure used to form the frame members of FIG. 34 showing that the frame-member blank includes a guide panel and alignment panels coupled along opposing sides of the guide panel.

Each frame member 541, 543 includes a plurality of complimentary connectors 540 and slots 544 that engage with one another to hold frame members 541, 543 together as suggested in FIGS. 34 and 35. Each connector 540 includes a lock tab 542 and one or more spacers 548. Lock tabs 542 are received through slots 544 to hold H-frame 537 together, and spacers 548 maintain a gap between frame members 541, 543 to define pocket 520. Guide panels 545 and connectors 540 define pocket 520. Each frame member 541, 543 is formed from a frame-member blank 580 shown in FIG. 40.

Figure 36:
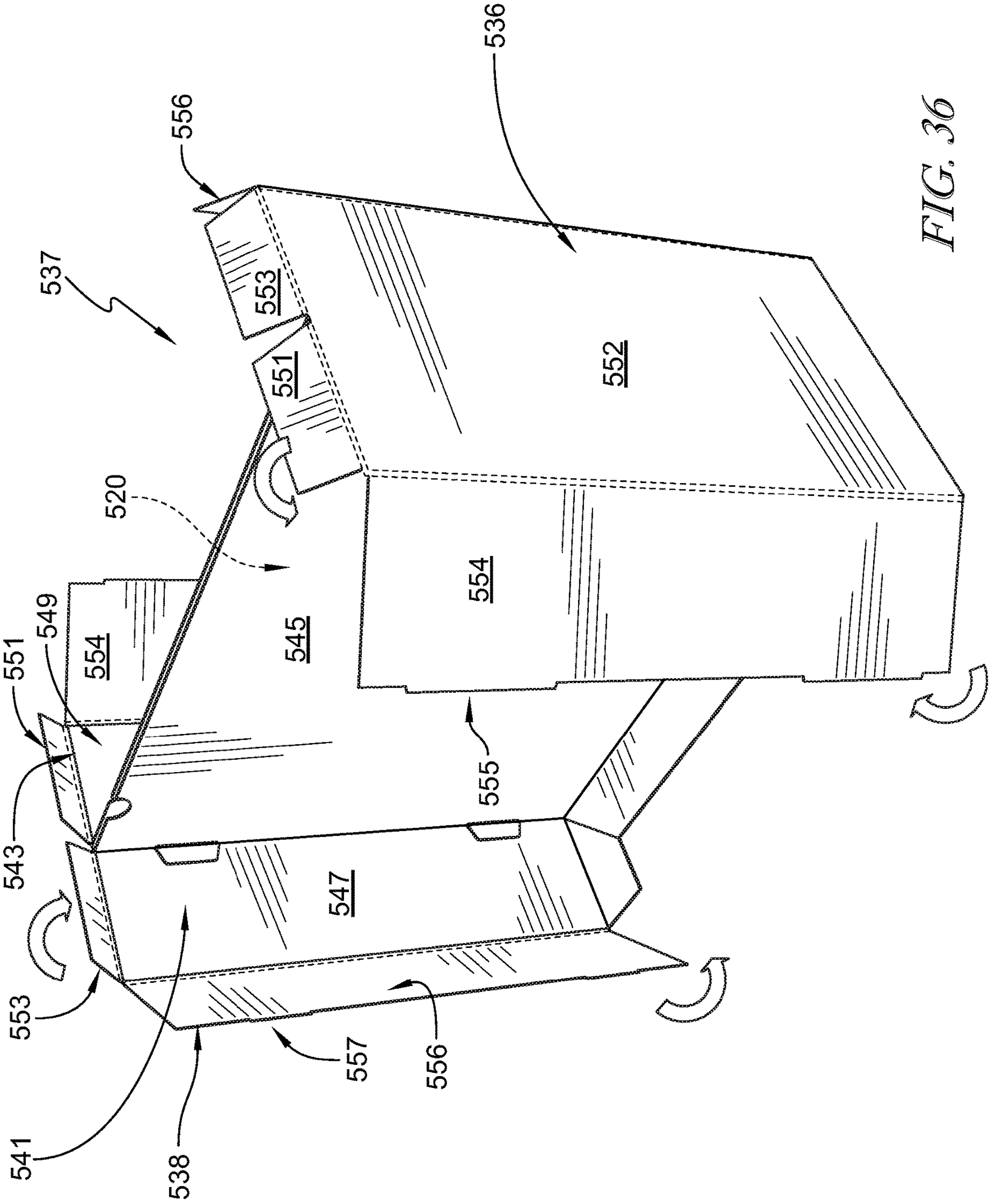
Figure 41:
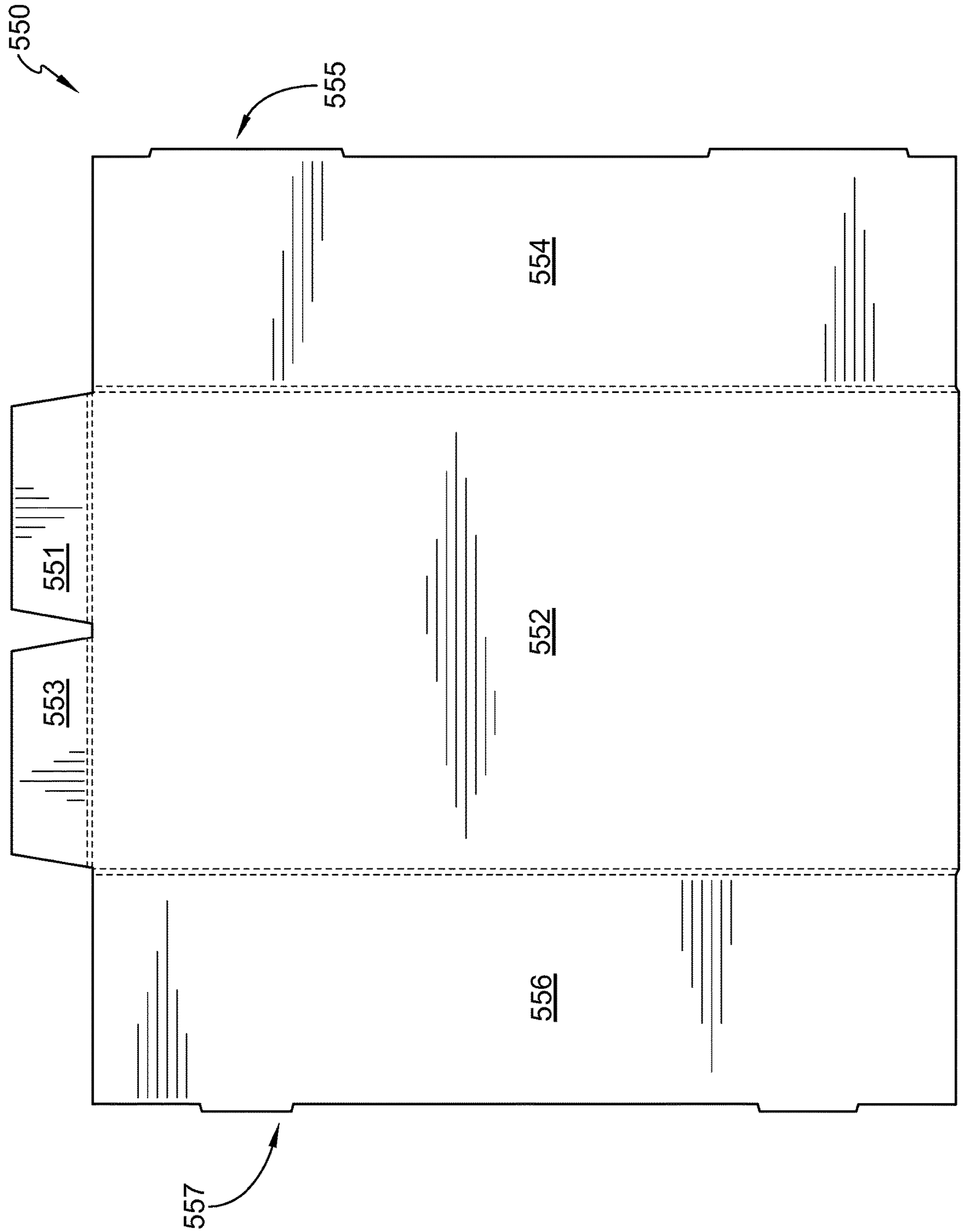
FIG. 41 is a top plan view of an embodiment of a graphic-wrapper blank in accordance with the present disclosure used to form the graphic wrappers of FIG. 36 showing that the graphic wrapper includes a display-side panel defining a side of the product display when assembled, grip flaps coupled to the display-side panel to secure the graphic wrapper to the H-frame, and cover flaps coupled to the display-side panel to conceal upper portions of the H-frame.

Graphic wrappers 536, 538 are coupled to frame members 541, 543 to form H-frame 537 as suggested in FIG. 36. Each graphic wrapper 536, 538 includes a display-side panel 552, grip flaps 554, 556 coupled to display-side panel 552, and cover flaps 551, 553 coupled to display-side panel 552. Display-side panel 552 defines an exterior side of product display 510 when assembled. Cover flaps 551, 553 fold over upper portions of alignment panels 547, 549 of frame members 541, 543. Grip flaps 554, 556 fold around alignment panels 547, 549 and tabs 555, 557 extending from grip flaps 554, 556 engage with guide panels 545 to secure graphic wrappers 536, 538 onto frame members 541, 543. In some embodiments, display-side panels 552 are printed with graphics or other indicia. Each graphic wrapper 536, 538 is formed from a graphic-wrapper blank 550 shown in FIG. 41.

Figure 39:
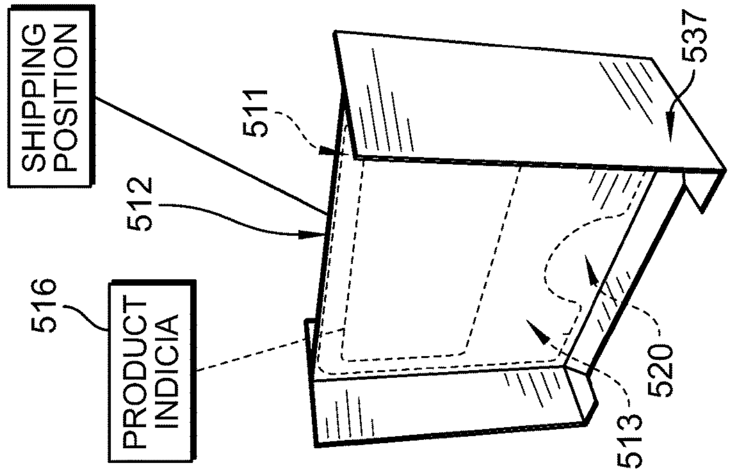
FIG. 39 is a view similar to FIG. 38 showing the header board in a shipping position and suggesting that the header board slides in the pocket of the H-frame to obscure at least a portion of the product indicia when the header board is moved to the shipping position.
Figure 38:
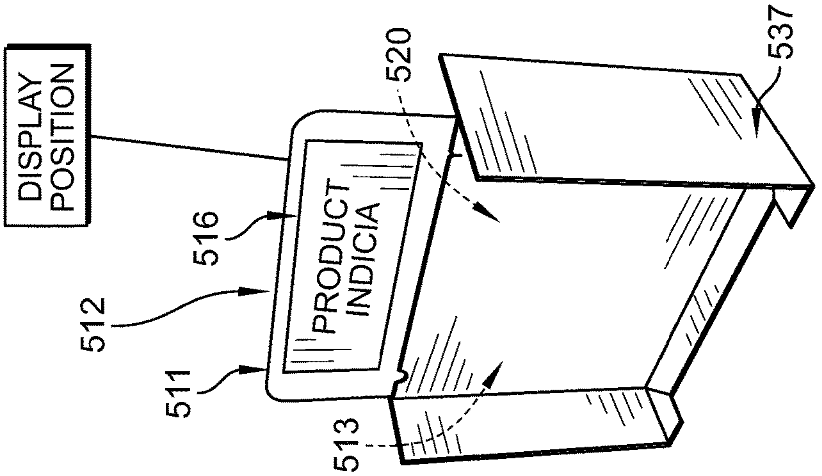
FIG. 38 is a view similar to FIG. 37 showing the header board received in a pocket defined between frame members of the H-frame and suggesting that the elastic members are biasing the header board toward the display position.
Figure 37:
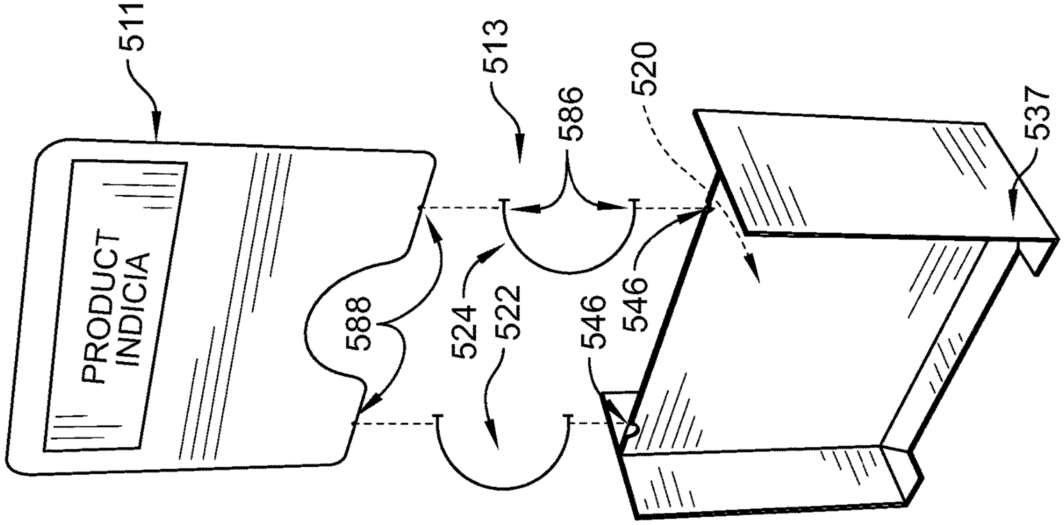
FIG. 37 is a perspective view of the H-frame of FIG. 36 showing that the display header includes a header board and elastic members and suggesting that the elastic members engage with the header board and the H-frame to support the header board.

Header mount 513 includes a pair of elastic members 522, 524 that engage with H-frame 537 and header board 511 to support header board 511 on product-support structure 514 as suggested in FIG. 37. In some embodiments, elastic members 522, 524 are formed as elongated strands of stretchable material, and the number of elastic members 522, 524 can be increased or decreased to adjust for size, weight, display position height, etc. of display header 512. Each elastic member 522, 524 includes barbs 586 positioned at opposing ends thereof. One end of elastic members 522, 524 are fed into slots 546 of H-frame 537 with an opposing end of elastic members 522, 524 being fed into slots 588 of header board 511. Barbs 586 engage with header board 511 and H-frame 537. Elastic members 522, 524 are configured to stretch to allow header board 511 to slide in pocket 520 between the display and shipping positions at the selection of a user as suggested in FIGS. 38 and 39. In some embodiments, display header 512 is attached to product-support structure 514 before product is stored in product-support structure 514 and shipped to a retail location.

In some embodiments, product display 510 can be combined with an outer cover to form a transport package to retain the product on product-support structure 514 during shipping. The outer casing moves display header 512 from the display position to the shipping position and holds display header 512 in the shipping position during transit of product display 510 to a retail location. A user of product display 510 removes the outer casing to expose the product stored in product-support structure 514 and header mount

513 moves header board 511 to the display position for showing product indicia 516 to customers at the retail location.

Figure 42:
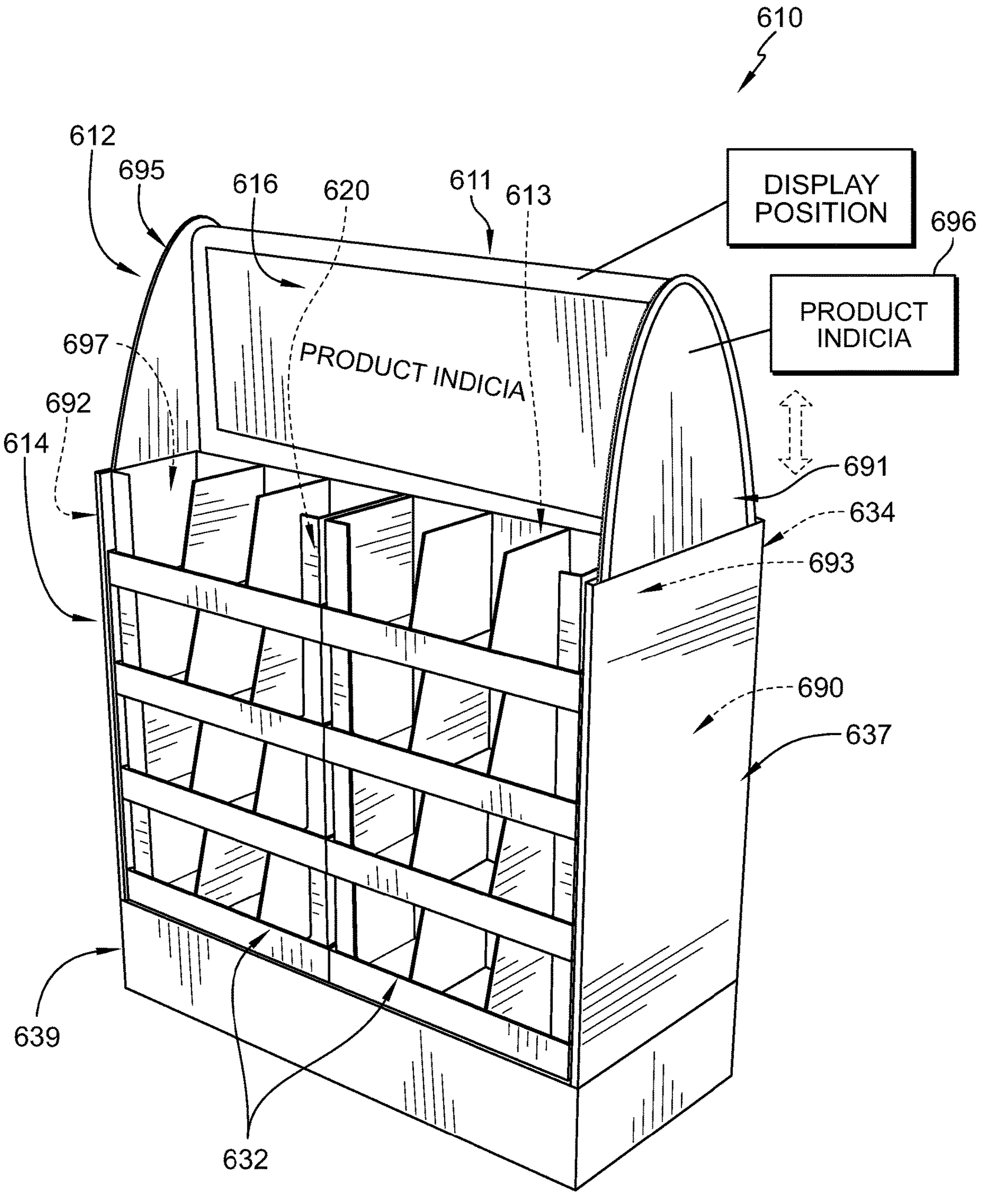
FIG. 42 is a perspective view of another embodiment of a product display in accordance with the present disclosure showing that the product display includes a display header positioned within a product-support structure for showing product indicia related to products stored in the product-support structure to a customer at a retail location when the display header is in a display position.

Another embodiment of a product display 610 in accordance with the present disclosure is shown in FIG. 42. Product display 610 includes a display header 612 positioned within a product-support structure 614. Product-support structure 614 is configured to support product for display in a retail setting. Product indicia 616, 696 related to products stored in product-support structure 614 is positioned on display header 612 and visible when display header 612 is in a display position as shown in FIG. 42.

Display header 612 includes header boards 611, 691, 695 and header mounts 613, 693, 697 coupled to an H-frame 637 to support header boards 611, 691, 695, respectively, for movement relative to product-support structure 614 between the display position, as shown in FIG. 42, and a shipping position at the selection of a user. In the illustrative embodiment, product indicia 616 is positioned on a front side and back side of header board 611 and product indicia 696 is positioned on at least outward facing portions of side header boards 691, 695. At least a portion of product indicia 616, 696 is obscured from view when display header 612 is in the shipping position and a height of product display 610 is reduced compared to when display header 612 is in the display position. Header mounts 613, 693, 697 bias header boards 611, 691, 695, respectively, toward the display position to support the display header 612 in the display position for showing product indicia 616, 696 to customers at a retail location.

Header board 611 is received in a pocket 620 of H-frame 637 as suggested in FIG. 42. Pocket 620 locates header board 611 relative to product-support structure 614 and is configured to guide header board 611 between the display and shipping positions. Pocket 620 and header board 611 are aligned with front-side display vehicles 632 and back-side display vehicles 634 of product-support structure 614 where product is stored as suggested in FIG. 42, but other orientations for pocket 620 and header board 611 are contemplated by the present disclosure. Side header boards 691, 695 are received in side pockets 690, 692, respectively, along lateral sides of product-support structure 614. Side pockets 690, 692 locate side header boards 691, 695 relative to product-support structure 614 and are configured to guide side header boards 691, 695 between the display and shipping positions. Side pockets 690, 692 and side header boards 691, 695 are aligned perpendicular to header board 611 and pocket 620 as shown in FIG. 42, but other orientations for side pockets 690, 692 and side header boards 691, 695 are contemplated by the present disclosure.

In the illustrative embodiment, product-support structure 614 includes front-side and back-side display vehicles 632, 634 aligned relative to H-frame 637 as shown in FIG. 42. Display vehicles 632, 634 can be any type of display vehicle, such as cabinets, risers, stacked trays, three-sided structures, and other structures that support or otherwise store product for display and transportation. Each display vehicle 632, 634 is formed to define product-storage areas for storing products for display.

Figure 43:
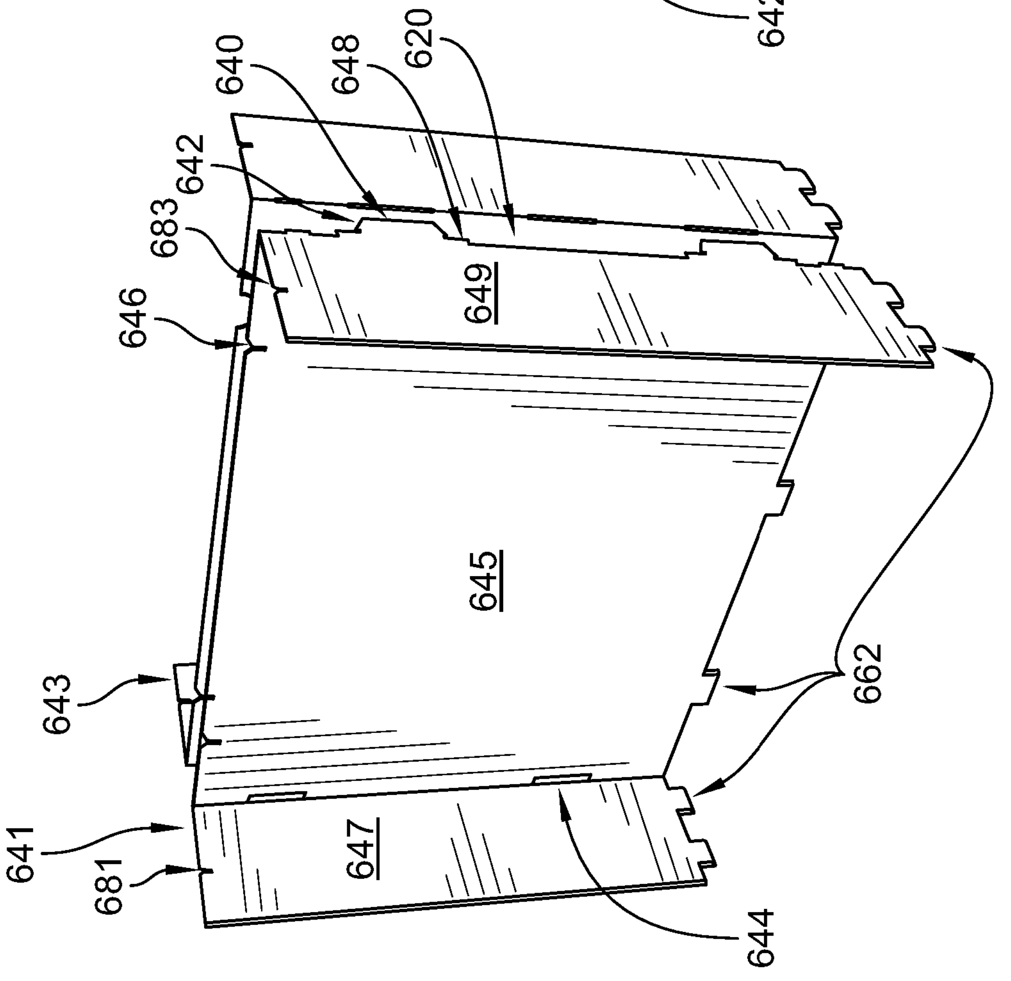

H-frame 637 of product-support structure 614 includes a pair of opposingly faced frame members 641, 643 as shown in FIG. 43. Frame members 641, 643 come together to define pocket 620 for receiving header board 611 as suggested in FIG. 44. Each frame member 641, 643 includes a guide panel 645 and alignment panels 647, 649 coupled along opposing sides of guide panel 645. Mount tabs 662 are coupled to lower portions of panels 645, 647, 649 and engage with slots 664 of a platform 639 to hold frame members 641, 634 on platform 639 as suggested in FIGS. 43 and 44. Alignment panels 647, 649 engage with display vehicles 632, 634 to align the components of product-support structure 614 on platform 639. Platform 639 assists in holding the components of product-support structure 614 together and for supporting product-support structure 614 during transport.

Figure 44:
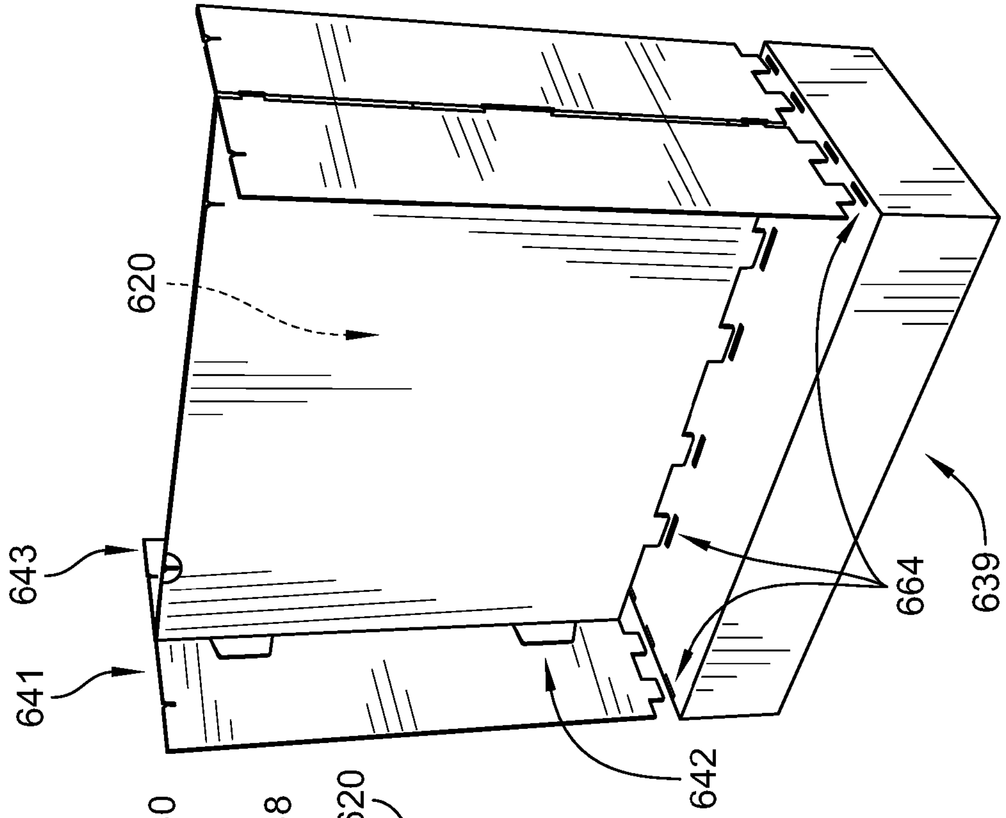
FIGS. 43-46 are a series of views showing a process in accordance with the present disclosure for assembling an H-frame onto a platform of the product-support structure.

Each frame member 641, 643 includes a plurality of complimentary connectors 640 and slots 644 that engage with one another to hold frame members 641, 643 together as suggested in FIGS. 43 and 44. Each connector 640 includes a lock tab 642 and one or more spacers 648. Lock tabs 642 are received through slots 644 to hold H-frame 637 together, and spacers 648 maintain a gap between frame members 641, 643 to define pocket 620. Guide panels 645 and connectors 640 define pocket 620. In some embodiments, frame members 641, 643 are formed from a frame-member blank.

Figure 46:
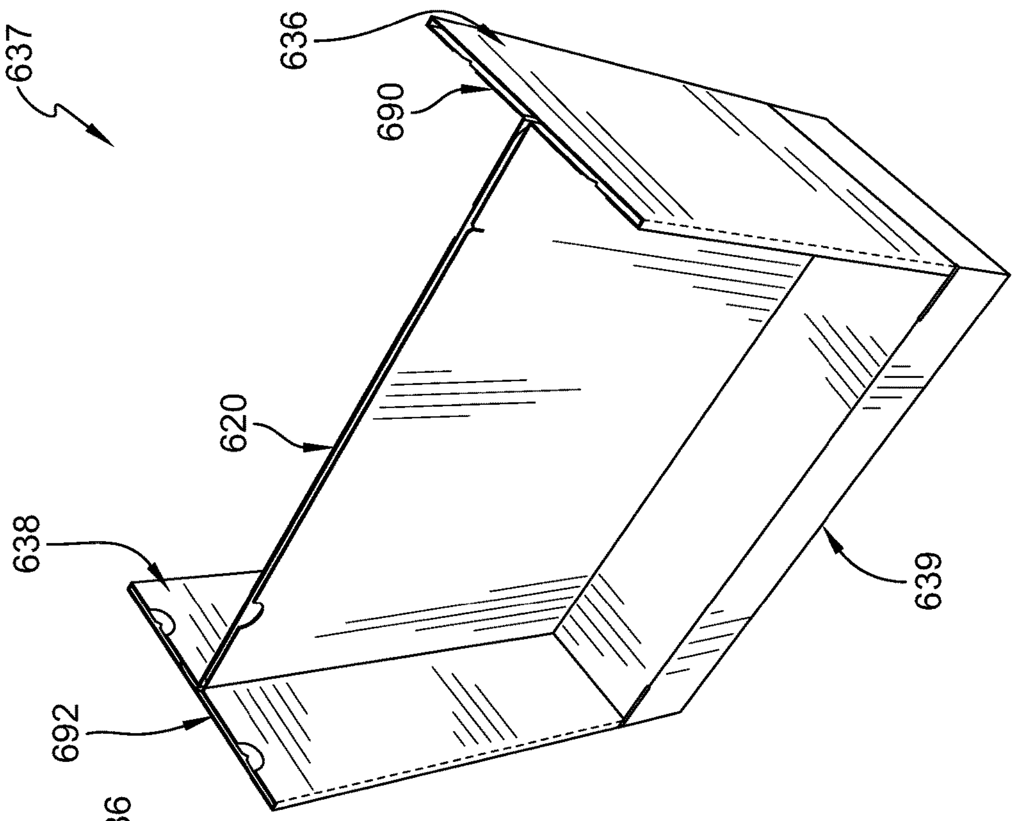
Figure 45:
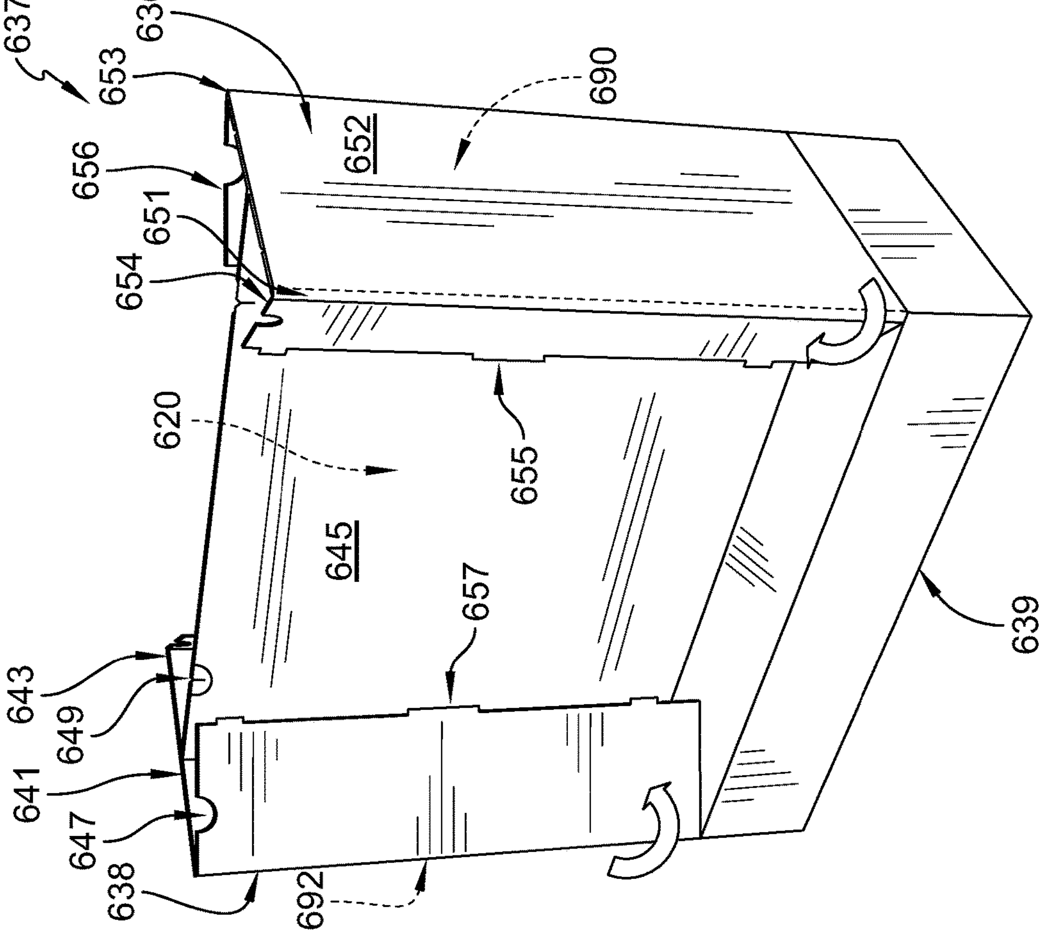

Graphic wrappers 636, 638 are coupled to frame members 641, 643 to define side pockets 690, 692 and form H-frame 637 as suggested in FIGS. 45 and 46. Each graphic wrapper 636, 638 includes a display-side panel 652 and grip flaps 654, 656 coupled to display-side panel 652 by spacer strips 651, 653, respectively. Display-side panel 652 defines an exterior side of product display 610 when assembled. Grip flaps 654, 656 fold around alignment panels 647, 649 of frame members 641, 643 and tabs 655, 657 extending from grip flaps 654, 656 engage with guide panels 645 to secure graphic wrappers 636, 638 onto frame members 641, 643. Spacer strips 651, 653 position display-side panel 652 apart from alignment panels 647, 649 to define side pockets 690, 692. In some embodiments, display-side panels 652 are printed with graphics or other indicia. In some embodiments, graphic wrappers 636, 638 are formed from graphic-wrapper blanks.

Figure 48:
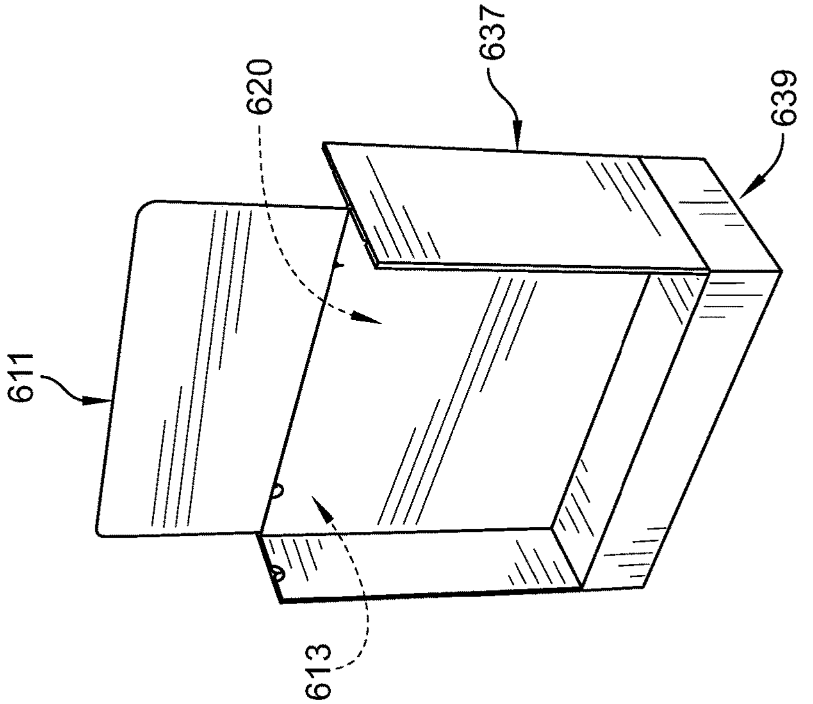
FIG. 48 is a view similar to FIG. 47 showing the first header board received in a first pocket defined between frame members of the H-frame.
Figure 47:
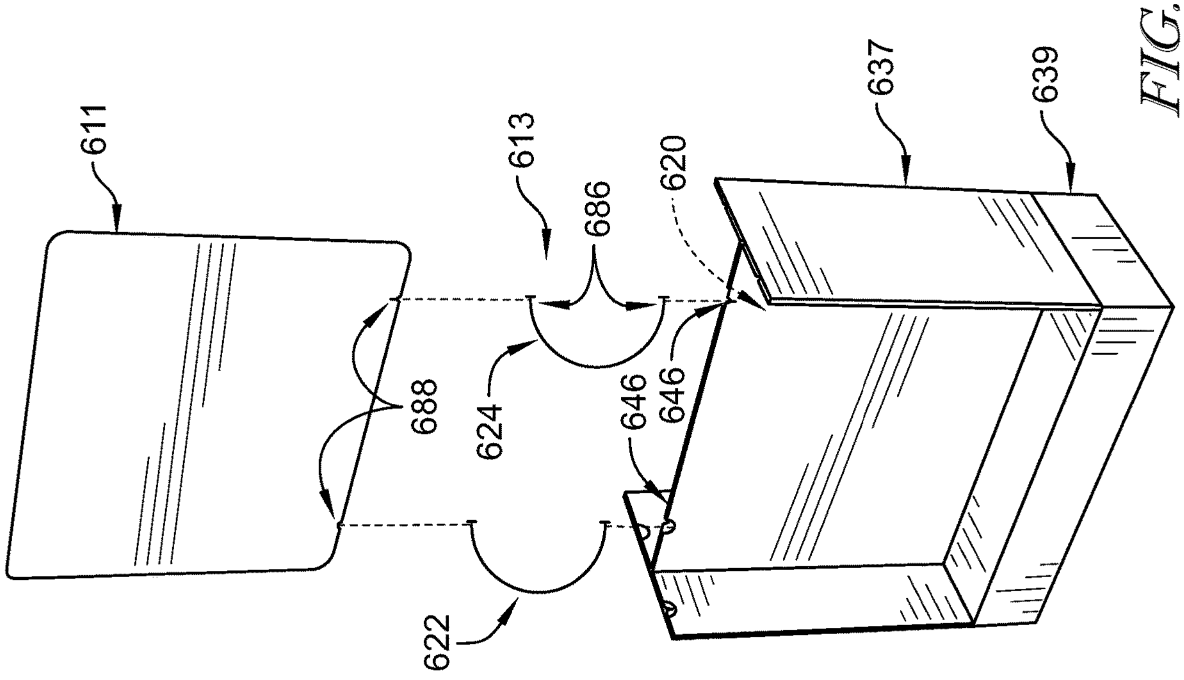
FIG. 47 is a perspective view of the H-frame of FIG. 46 showing a first header board and first set of elastic members of the display header positioned for attachment with the H-frame and suggesting that the first set of elastic members engage with the first header board and the H-frame to support the first header board.

Header mount 613 includes a pair of elastic members 622, 624 that engage with H-frame 637 and header board 611 to support header board 611 on product-support structure 614 as suggested in FIGS. 47 and 48. In some embodiments, elastic members 622, 624 are formed as elongated strands of stretchable material, and the number of elastic members 622, 624 can be increased or decreased to adjust for size, weight, display position height, etc. of header board 611. Each elastic member 622, 624 includes barbs 686 positioned at opposing ends thereof. One end of elastic members 622, 624 are fed into slots 646 of H-frame 637 with an opposing end of elastic members 622, 624 being fed into slots 688 of header board 611. Barbs 686 engage with header board 611 and H-frame 637. Elastic members 622, 624 are configured to stretch to allow header board 611 to slide in pocket 620 between the display and shipping positions at the selection of a user.

Figure 50:
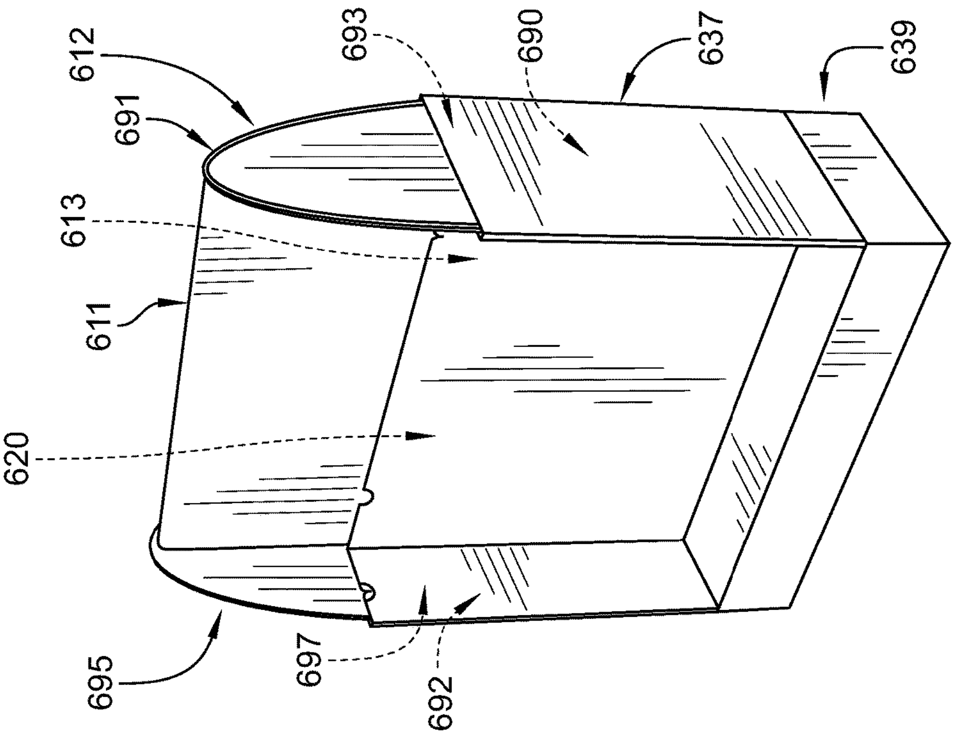
FIG. 50 is a view similar to FIG. 49 showing the second header board received in a second pocket and a third header board received in a third pocket defined along lateral sides of the frame members of the H-frame.
Figure 49:
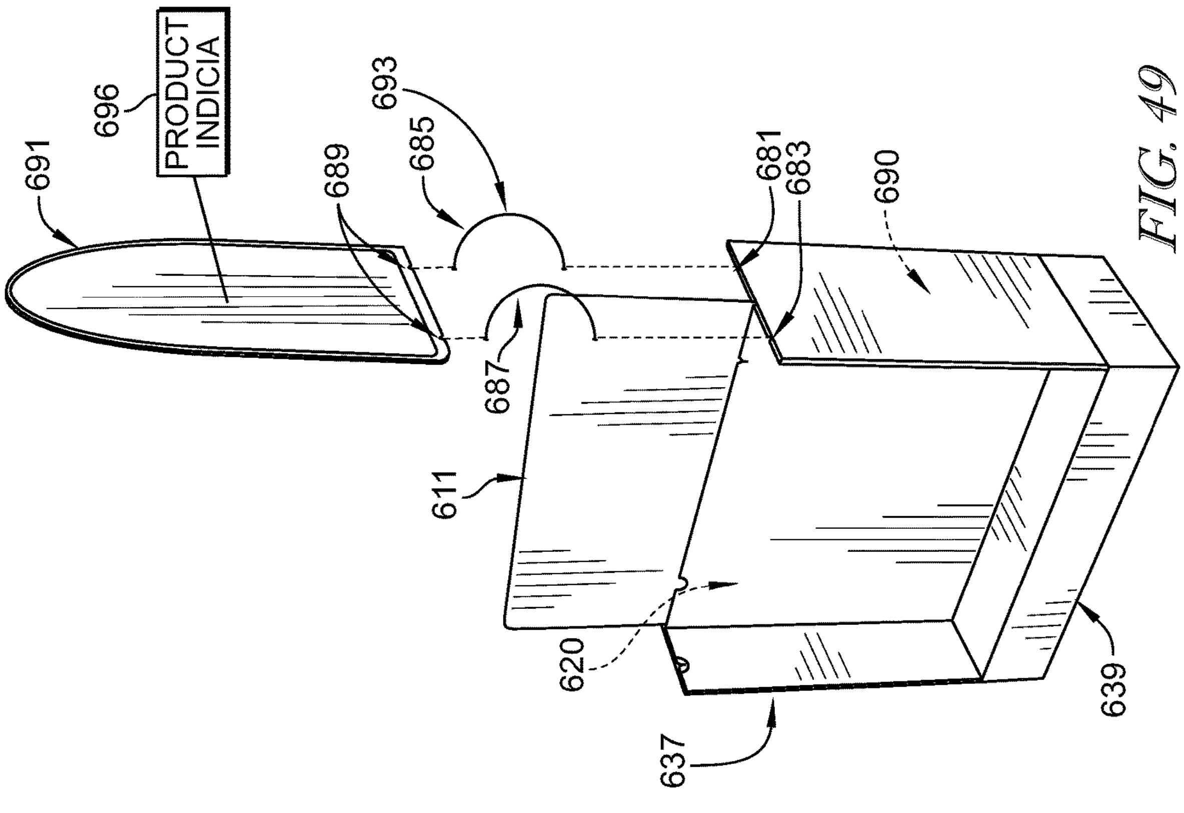
FIG. 49 is a view similar to FIG. 48 showing a second header board and second set of elastic members of the display header positioned for attachment with the H-frame and suggesting that the second set of elastic members engage with the second header board and the H-frame to support the second header board.
Figure 52:
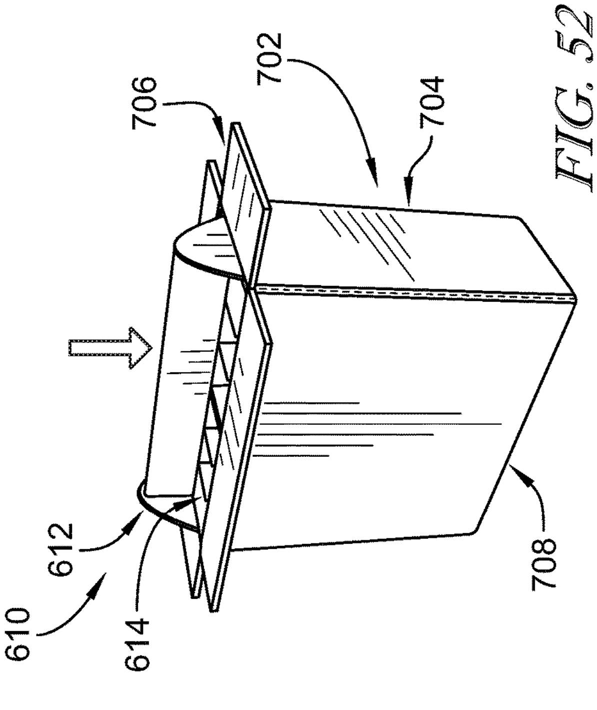
FIGS. 51-54 are a series of views showing a process in accordance with the present disclosure for forming a transport package by positioning an outer casing relative to the product display.
Figure 54:
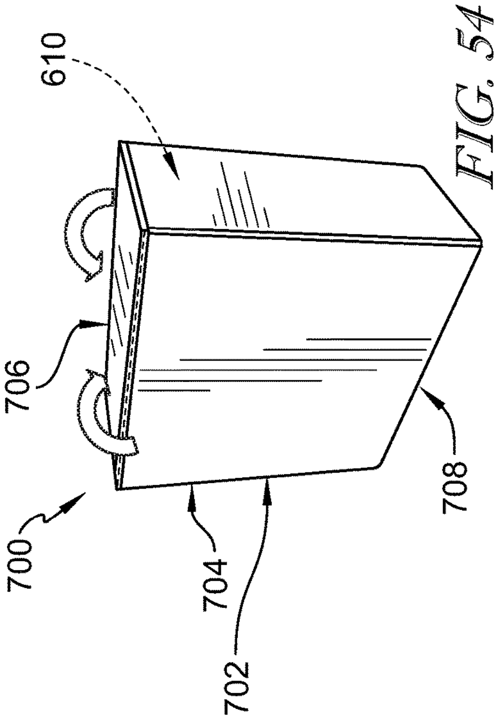
Figure 51:
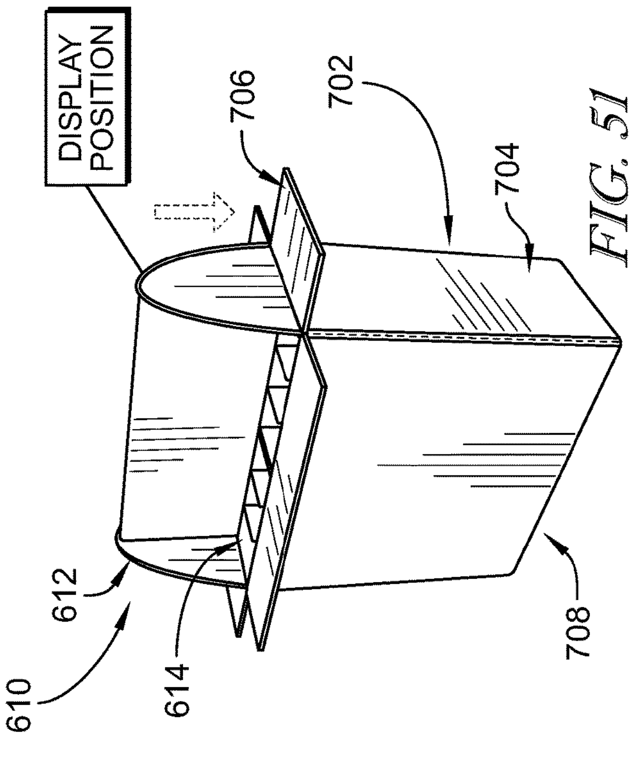
Figure 53:
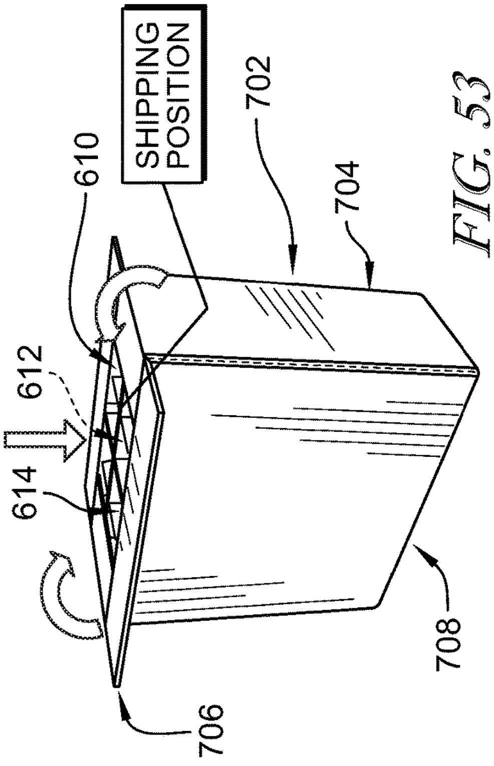

Side header mount 693 includes a pair of elastic members 685, 687 that engage with H-frame 637 and side header board 691 to support side header board 691 on H-frame 637 as suggested in FIGS. 49 and 50. Elastic members 685, 687 are similar to elastic members 622, 624, and the number of elastic members 685, 687 can be increased or decreased to adjust for size, weight, display position height, etc. of side header board 691. One end of elastic members 685, 687 are fed into slots 681, 683, respectively, of H-frame 637 with an opposing end of elastic members 685, 687 being fed into slots 689 of side header board 691. Elastic members 685, 687 are configured to stretch to allow side header board 691 to slide in side pocket 690 between the display and shipping positions at the selection of a user. Side header board 695 is mounted to H-frame in side pocket 692 using side header mount 697 similar to side header board 691 and side header mount 693. In some embodiments, display header 612 is attached to product-support structure 614 before product is stored in product-support structure 614 and shipped to a retail location.

One illustrative process for assembling a transport package 700 is shown in FIGS. 51-54. An outer casing 702 is sized to receive product display 610 therein. Outer casing 702 is positioned to surround product display 610 to form transport package 700 and retain the product on product-support structure 614. Outer casing 702 includes a body 704, top closure flaps 706, and bottom closure flaps 708. A user (such as a packager) moves display header 612 from the display position to the shipping position and closes top flaps 706 over product display 610 to hold display header 612 in the shipping position during transit of product display 610 to a retail location. A user of product display 610 (such as an employee at a retail location) removes outer casing 702 to expose the product stored in product-support structure 614 and header mounts 613, 693, 697 move header boards 611, 691, 695 to the display position for showing product indicia 616, 696 to customers at the retail location.

It is within the scope of the present disclosure to make product-support structures, header boards, containers, frame members, and trays in accordance with the present disclosure from a variety of materials including corrugated paperboard, folding carton, solid fiber, plastic sheeting, plastic corrugated, combinations thereof, or any other suitable material. In illustrative embodiments, product-support structures, header boards, containers, frame members, and trays may be formed from the same or different materials.

In illustrative embodiments, product displays can be of various sized, such as ¼ pallet, half pallet, and full pallet for example. Product-support structures can be formed using various display vehicles, such as cabinets, risers, stacked trays, three-sided structures, and other structures that support or otherwise store product for display and transportation. The display vehicles can be of various sizes.

In illustrative embodiments, the display headers automatically pop-up when used. The display headers are adaptable for use with a variety of product-support structures in a retail environment.

In illustrative embodiments, the display headers include elastic bands and a graphic header board which in combination attach to a product-support structure. Once the display header is attached to a product-support structure, the graphic header board is moved into the down position for shipment. A shrink film or corrugated shroud are placed around the product-support structure and display header to protect it for shipment. Once the product display arrives to its intended destination (e.g., a retail location), a user removes the protective cover and the header board will automatically be lifted upward via the elastic bands into the up position for showing the graphics on the front and/or back.

In illustrative embodiments, no labor is involved by a user in the retail setting. This solves a problem in that current graphic headers ship loose or separate from the display vehicle. Many times those loose headers are placed on the top or may be attached via plastic rivets or clips. In either case, a user must find the header (if loose), read the set up instruction sheet, and attach the header to the display vehicle. The display headers of the present disclosure automatically move the graphic element (e.g., header board) up into position meeting retail compliance requirements and saving labor.

In illustrative embodiments, product-support structures or display vehicles can include product-support structures, stacked trays, three-sided structures, and other structures that support or otherwise store product for display and transportation.

The invention claimed is:

1. A product display comprising:

a product-support structure adapted to support product for display in a retail location, the product-support structure defining a pocket, and a display header coupled to the product-support structure, the display header including a header board and a header mount coupled to the product-support structure in a fixed position relative to the product-support structure, wherein the header board is at least partially received in the pocket of the product-support structure, and the header mount is configured to provide means for supporting the header board in a display position where product indicia positioned on the header board is visible and to allow the header board to move in the pocket relative to the product-support structure to a shipping position at the selection of a user where at least a portion of the product indicia is obscured by the product-support structure and to reduce a height of the product display, wherein the header mount includes at least one elastic member configured to automatically move the header board from the shipping position to the display position, wherein the at least one elastic member comprises an elongated strand of stretchable material, wherein the elastic member has a first end is secured to the product-support structure, wherein the elastic member is stretched with the header board in the shipping position, and wherein the elastic member relaxes with the header board in the display position, relative to in the shipping position.

2. The product display of claim 1, wherein the at least one elastic member configured to bias the header board toward the display position.

3. The product display of claim 1, wherein the product-support structure includes a first display vehicle and a second display vehicle, and wherein the pocket is defined between the first and second display vehicles.

4. The product display of claim 3, further comprising a base tray configured to receive and support the first and second display vehicles therein.

5. The product display of claim 3, further comprising a spacer positioned between the first and second display vehicles to position the first and second display vehicles apart from one another and define the pocket.

6. The product display of claim 3, further comprising a coupler engaged with the first and second display vehicles to hold the first and second display vehicles together.

7. The product display of claim 6, wherein the coupler includes a display-side panel and grip flaps coupled to the display-side panel, wherein the display-side panel extends along a lateral side of the first display vehicle and the second display vehicle, and wherein each grip flap engages with one of the first or second display vehicle.

8. The product display of claim 6, further comprising a first container positioned on the first display vehicle and a second container positioned on the second display vehicle, wherein the coupler includes attachment flaps coupled to the display-side panel, and wherein the each attachment flap engages with one of the first container or the second container.

9. The product display of claim 3, wherein the at least one elastic member is coupled to the first display vehicle, the second display vehicle, and the header board.

10. The product display of claim 1, wherein the product-support structure includes an H-frame, a first display vehicle, and a second display vehicle, and wherein the H-frame is formed to define the pocket.

11. The product display of claim 10, wherein the pocket is positioned between the first and second display vehicles.

12. The product display of claim 10, wherein the H-frame includes at a first frame member coupled to a second frame member, and wherein the pocket is defined between the first and second frame members.

13. The product display of claim 12, wherein each of the first and second frame members includes a connector and a slot, and wherein the connectors of the first and second frame members engage with the slots of the other of the first and second frame members.

14. The product display of claim 12, wherein each connector includes a lock tab and a spacer, wherein the lock tab is configured to extend through one of the slots to hold the first and second frame members together, and wherein the spacer extends between the first end second frame members to space the first and second frame members apart and define the pocket.

15. The product display of claim 12, further comprising a graphic wrapper coupled to the first and second frame members.

16. The product display of claim 15, wherein the graphic wrapper includes a display-side panel and grip flaps coupled to the display-side panel, wherein the display-side panel extends along a lateral side of the first frame member and the second frame member, and wherein each grip flap engages with one of the first or second frame member to hold the graphic wrapper on the first and second frame members.

17. The product display of claim 15, further comprising a side header board and a side header mount, wherein a side pocket is defined between the graphic wrapper and the first and second frame members, and wherein the side header mount engaged with at least one of the first and second frame members and with the side header to support the side header for movement in the side pocket.

18. A transport package comprising:

a product display including:

a product-support structure adapted to support product for display in a retail location, the product-support structure defining a pocket, and a display header coupled to the product-support structure, the display header including a header board and a header mount coupled to the product-support structure in a fixed position relative to the product-support structure, and an outer casing sized to receive the product display in a space formed in the outer casing and configured to cover the product display, wherein the header board is at least partially received in the pocket of the product-support structure, and the header mount is configured to provide means for supporting the header board and to cause upward movement of the header board from a shipping position in which a portion of product indicia positioned on the header board is obscured by the product display to a display position in which the product indicia is visible in response to removal and separation of the outer casing from the product display, wherein the header mount includes at least one elastic member configured to automatically move the header board from the shipping position to the display position, wherein the at least one elastic member comprises an elongated strand of stretchable material, wherein the elastic member has a first end is secured to the product-support structure, wherein the elastic member is stretched with the header board in the shipping position, and wherein the elastic member relaxes with the header board in the display position, relative to in the shipping position.

19. The product display of claim 1, wherein the first end of the elastic member includes a barb secured to the product-support structure outside the pocket in both the shipping position and in the display position, and wherein a majority of the elastic member is inside the pocket under tension in the shipping position, and wherein the majority of the elastic member is inside the pocket in the display position.

20. The transport package of claim 18, wherein the first end of the elastic member includes a barb secured to the product-support structure outside the pocket in both the shipping position and in the display position, and wherein a majority of the elastic member is inside the pocket under tension in the shipping position, and wherein the majority of the elastic member is inside the pocket in the display position.

* * * * *